United States Patent
Umeda

(10) Patent No.: US 7,027,189 B2
(45) Date of Patent: Apr. 11, 2006

(54) IMAGE PROCESSING APPARATUS AND METHOD

(75) Inventor: Kiyoshi Umeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1051 days.

(21) Appl. No.: 10/026,754

(22) Filed: Dec. 27, 2001

(65) Prior Publication Data

US 2002/0085238 A1    Jul. 4, 2002

(30) Foreign Application Priority Data

Dec. 28, 2000 (JP) .............................. 2000-402710

(51) Int. Cl.
  *H04N 1/405* (2006.01)
  *H04N 1/409* (2006.01)
  *B41M 3/10* (2006.01)

(52) U.S. Cl. .................... 358/3.03; 358/3.26; 358/3.28

(58) Field of Classification Search ...... 358/3.03–3.05, 358/3.06, 3.28, 1.9, 3.26; 382/100, 252, 382/275
See application file for complete search history.

(56) References Cited

U.S. PATENT DOCUMENTS

| | | | |
|---|---|---|---|
| 6,690,811 B1 * | 2/2004 | Au et al. .................. | 382/100 |
| 6,694,041 B1 * | 2/2004 | Brunk ...................... | 382/100 |
| 6,760,464 B1 * | 7/2004 | Brunk ...................... | 382/100 |
| 6,763,121 B1 * | 7/2004 | Shaked et al. ............ | 382/100 |
| 6,824,240 B1 * | 11/2004 | Kusakabe et al. ......... | 358/1.9 |
| 6,853,736 B1 * | 2/2005 | Miyake .................... | 382/100 |
| 2003/0038181 A1 * | 2/2003 | Damera-Venkata ....... | 235/494 |
| 2003/0059084 A1 * | 3/2003 | Miyake et al. ............ | 382/100 |
| 2003/0133163 A1 * | 7/2003 | Wang et al. .............. | 358/3.28 |
| 2004/0218782 A1 * | 11/2004 | Brunk ...................... | 382/100 |
| 2004/0258273 A1 * | 12/2004 | Brunk ...................... | 382/100 |
| 2005/0031160 A1 * | 2/2005 | Shaked et al. ............ | 382/100 |
| 2005/0094844 A1 * | 5/2005 | Damera-Venkata ....... | 382/100 |

FOREIGN PATENT DOCUMENTS

| | | |
|---|---|---|
| JP | 05-301380 | 11/1993 |
| JP | 10-304179 | 11/1998 |
| JP | 11-268352 | 10/1999 |

* cited by examiner

*Primary Examiner*—Scott A. Rogers
(74) *Attorney, Agent, or Firm*—Fitzpatrick, Cella, Harper & Scinto

(57) ABSTRACT

In embedding a dot pattern in an image, use of a dot pattern component that mainly aims at suppressing any degradation in image quality sacrifices accurate information detection. Conversely, use of a component that aims at improving the detection accuracy largely degrades the image quality. Error diffusion is executed for an image, a component of a dot pattern to be embedded is determined on the basis of the image that has undergone error diffusion, and the dot pattern is embedded in the image that has undergone error diffusion using the determined component.

12 Claims, 32 Drawing Sheets

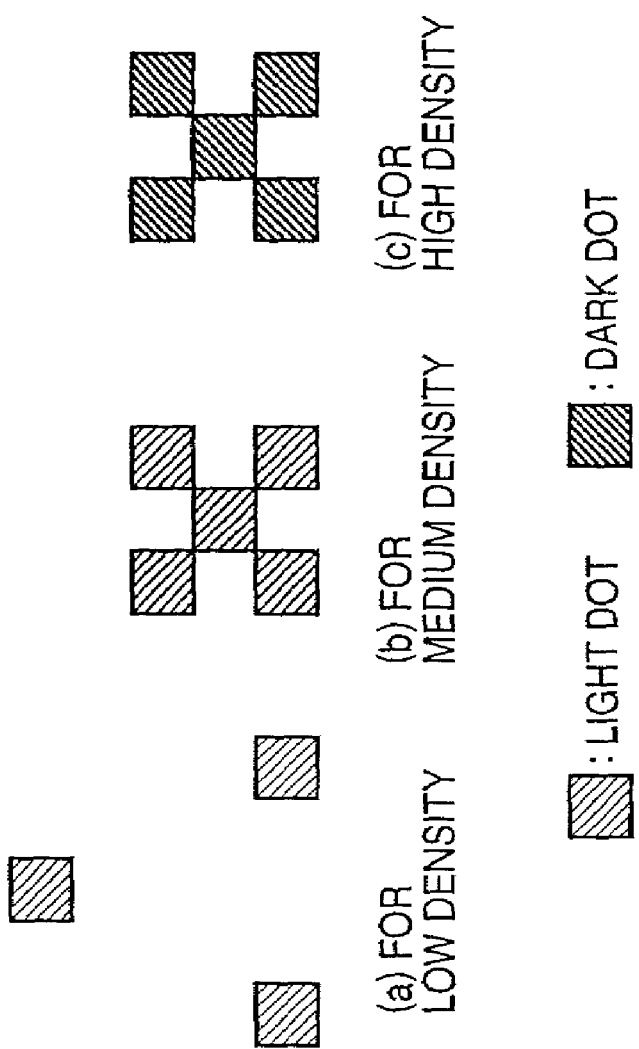
FIG. 6

FIG. 7
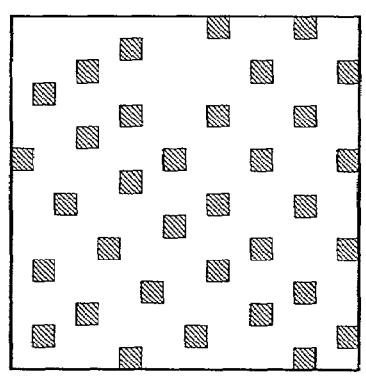
(a) COLOR COMPONENT IMAGE
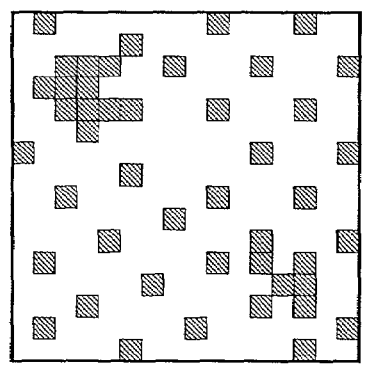
(b) WITHOUT DENSITY
MAINTAINING PROCESSING
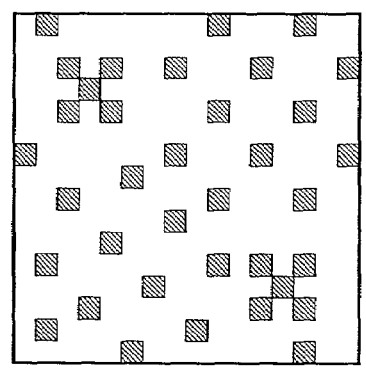
(c) WITH DENSITY
MAINTAINING PROCESSING

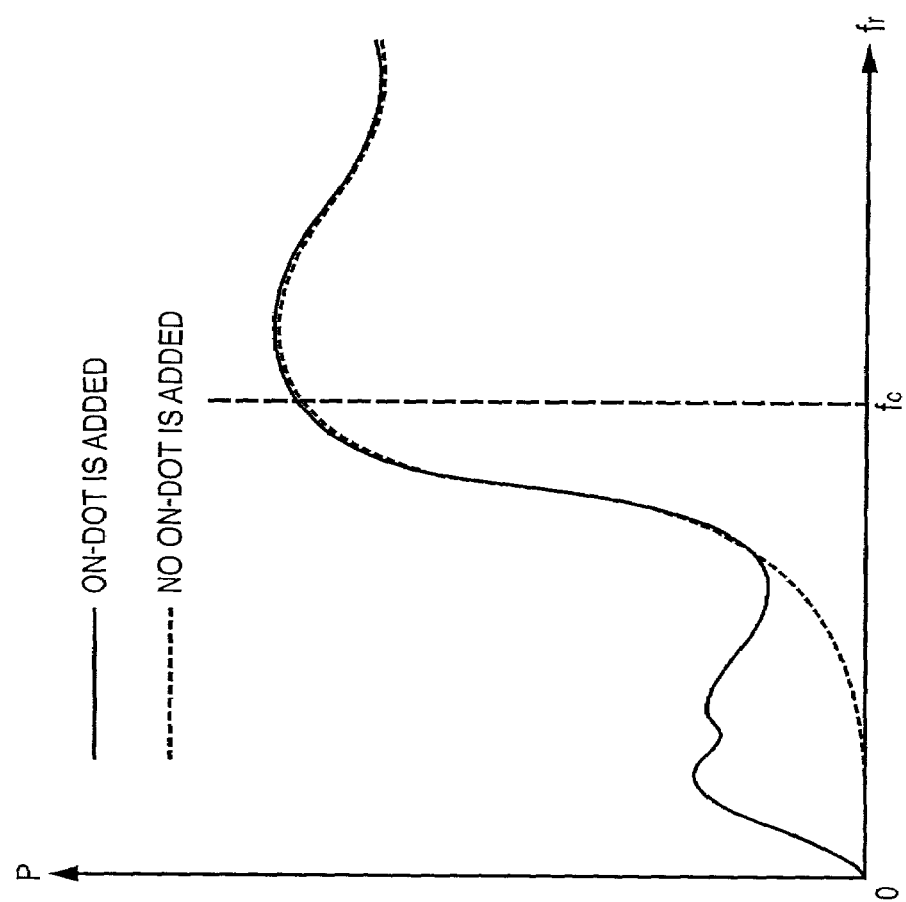

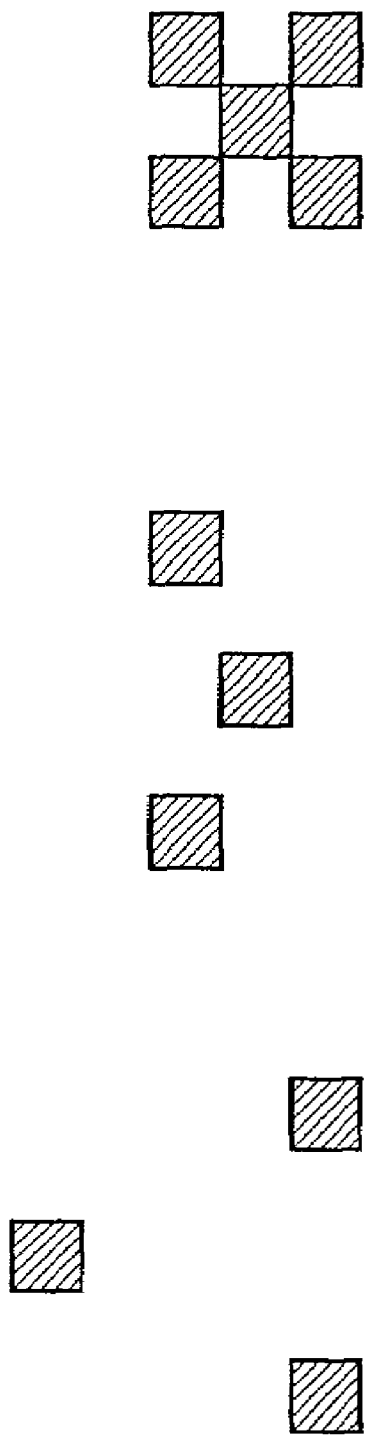
FIG. 11

F I G. 12
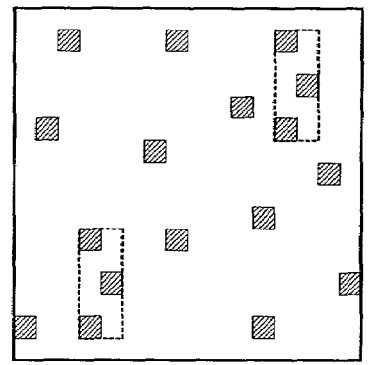
(b) P2 IS ADDED
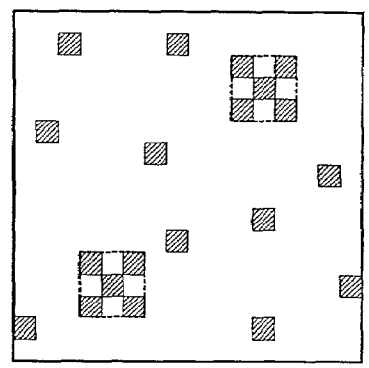
(c) P3 IS ADDED
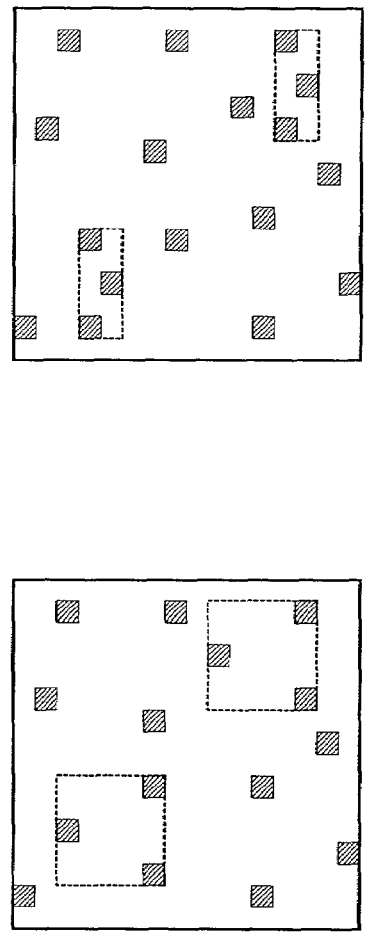
(a) P1 IS ADDED

FIG. 16C
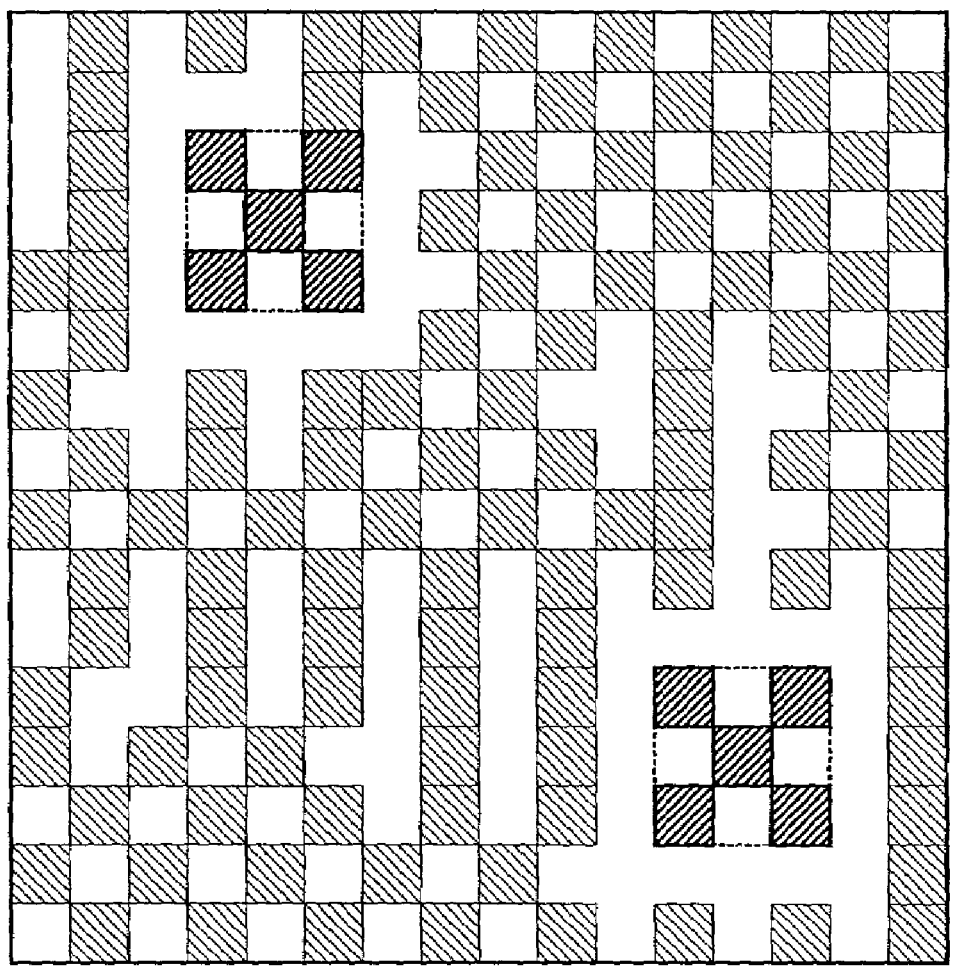
 : LIGHT DOT     : DARK DOT

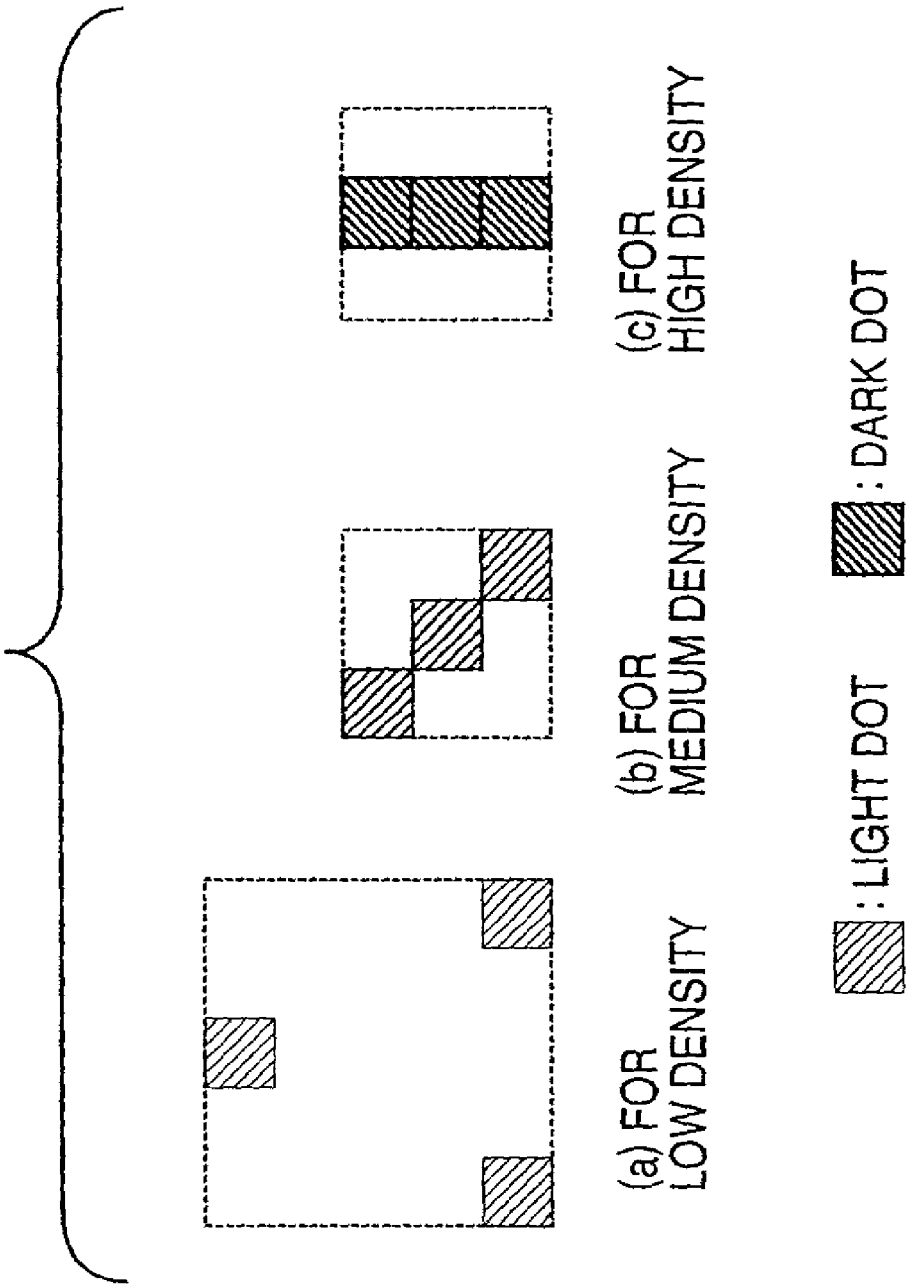

FIG. 18C
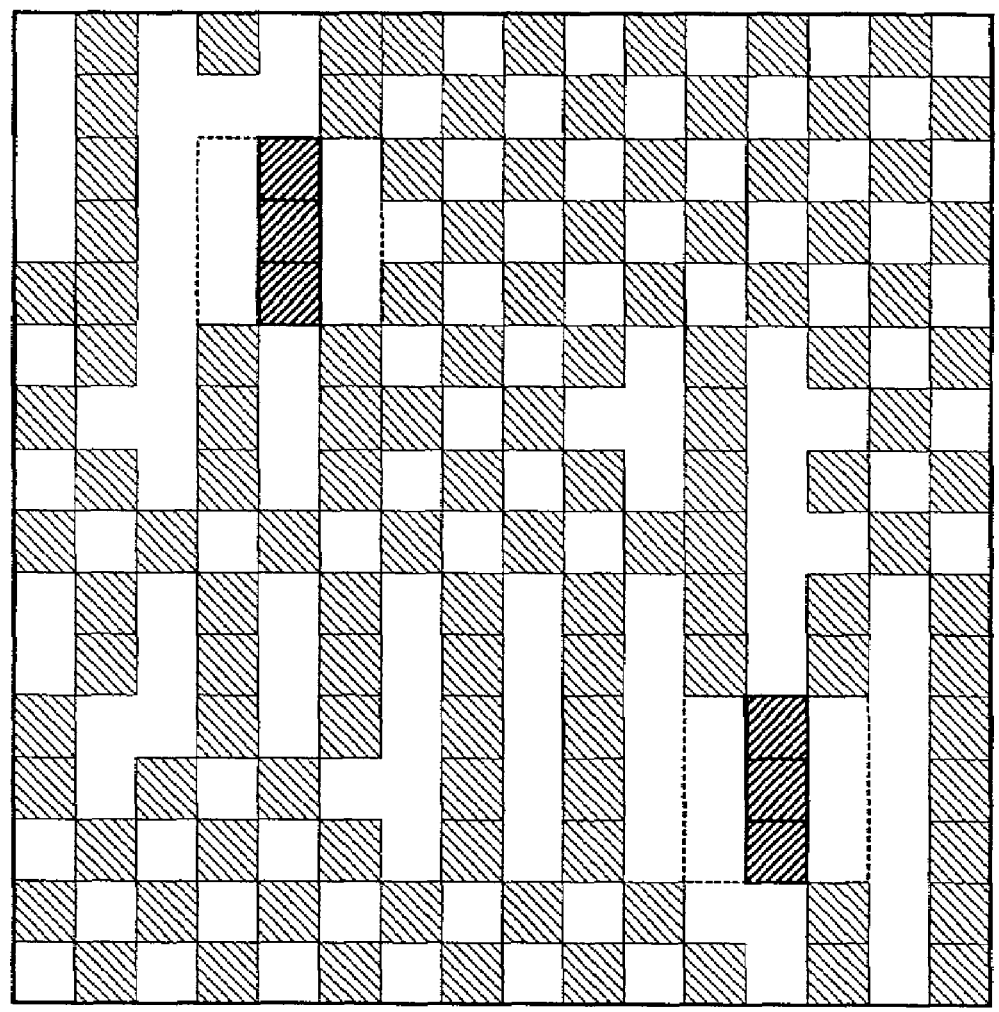
 : LIGHT DOT    : DARK DOT

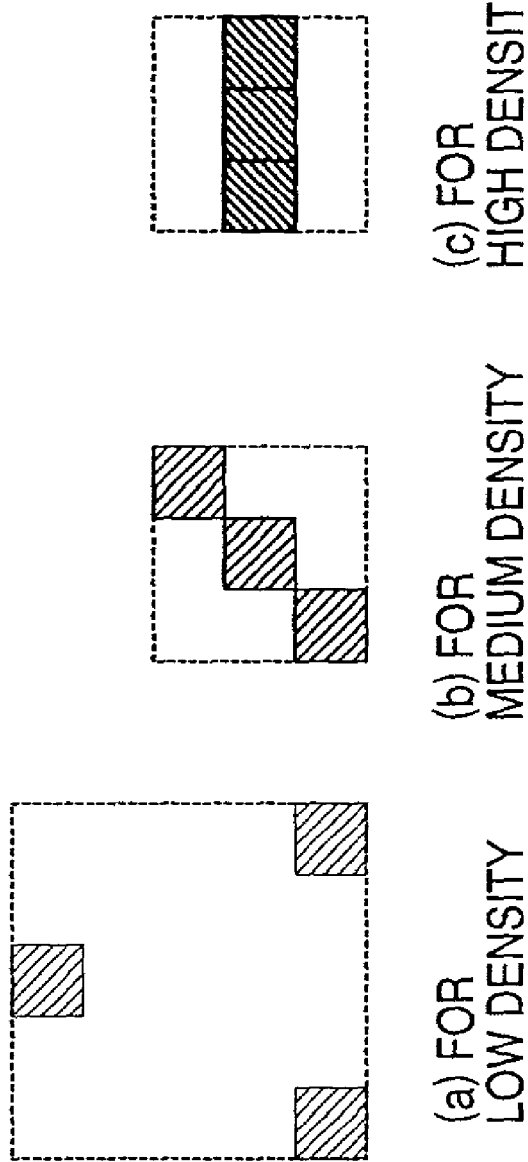

F I G. 20A
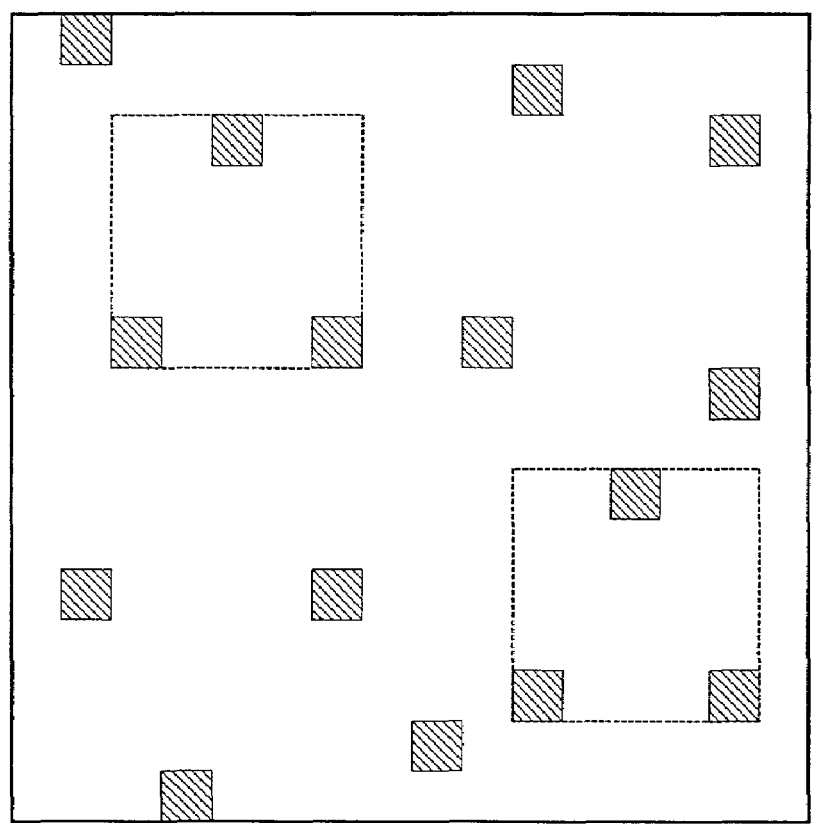

FIG. 20C
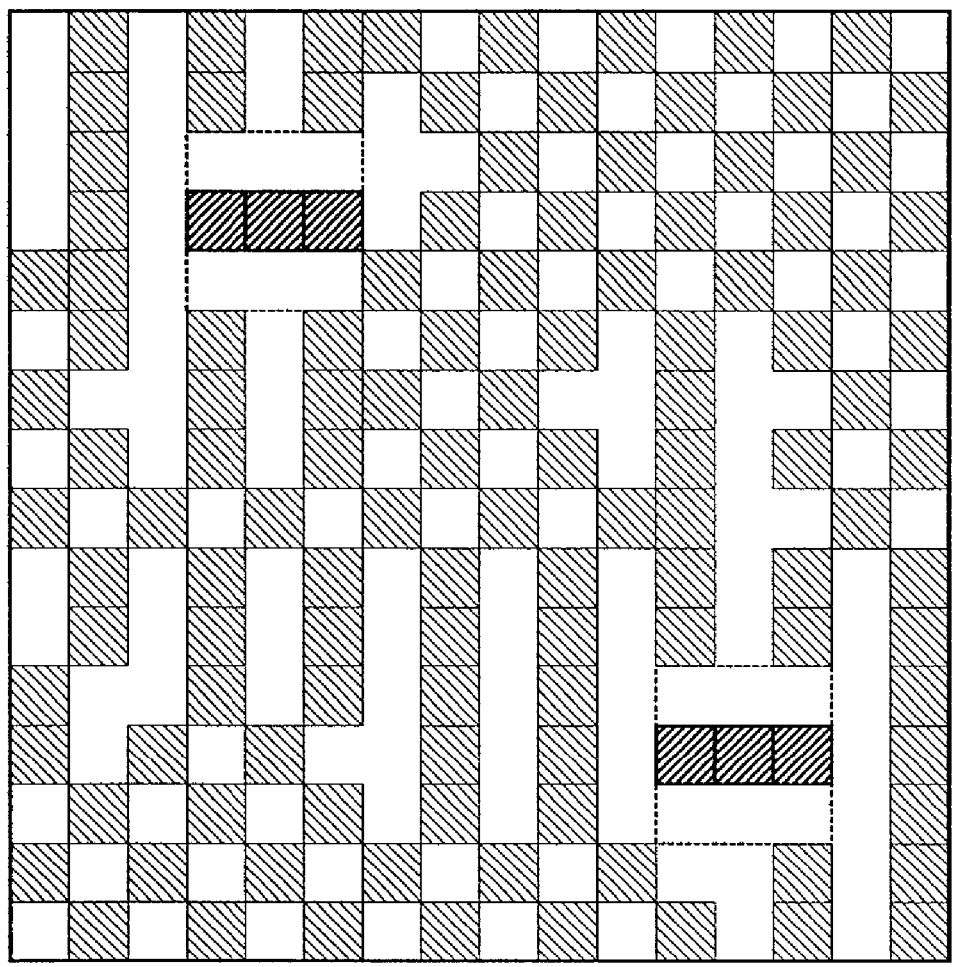
 : LIGHT DOT     : DARK DOT

IMAGE PROCESSING APPARATUS AND METHOD

FIELD OF THE INVENTION

The present invention relates to an image processing apparatus and method and, more particularly, to image processing of embedding a different kind of information in an image as added information.

BACKGROUND OF THE INVENTION

Apparatuses such as printers and copying machines that print or form color images are making great progresses in terms of both performance and penetration. In addition, to print or form full-color images, many schemes including silver halide scheme, thermal printing, electrophotography, electrostatic printing, and inkjet printing have been developed, and high-quality full-color images can be obtained. However, a new problem rises under these circumstances.

That is, bank notes and securities can easily be forged using a full-color image printing apparatus. For this reason, full-color image printing apparatuses must have a function of preventing forgery. Recent full-color image printing apparatuses have various forgery preventing functions. The most general scheme of implementing a forgery preventing function is so-called pattern tracking in which in printing an image, a periodic dot pattern representing the machine number of the apparatus or the like is printed on the printing paper sheet. If a forged bank note or the like is found, the machine number is detected from the dot pattern to specify the apparatus used for forgery. The dot pattern is printed on all printing paper sheets to be output from the apparatus and is therefore generally printed using the most unnoticeable color, i.e., yellow.

In an apparatus for adding a different kind of information except an image by printing such a dot pattern on a printing paper sheet together with an image (to be expressed as "embedding a dot pattern in an image" hereinafter), the influence of the embedded dot pattern on the image and the accuracy of the different kind of information detected from the printed image depend on the shape of an on-dot pattern (to be described later) as a component of the embedded dot pattern. That is, use of an on-dot pattern that mainly aims at suppressing any degradation in image quality sacrifices accurate information detection. Conversely, use of an on-dot pattern that aims at improving the detection accuracy largely degrades the image quality.

SUMMARY OF THE INVENTION

The present invention has been made to solve the above problems individually or altogether, and has as its object to provide dot pattern embedding that suppresses any degradation in image quality and ensures high detection accuracy.

In order to achieve the above object, according to a preferred aspect of the present invention, an image processing apparatus for embedding a dot pattern which indicates added information, comprising: a halftone processor, arranged to execute error diffusion for an image; a determiner, arranged to determine a component of the dot pattern to be embedded on the basis of the image that has undergone error diffusion; and an embedding section, arranged to embed the dot pattern in the image that has undergone error diffusion using the determined component is disclosed.

Also, an image processing method of embedding a dot pattern which indicates added information, comprising the steps of: executing error diffusion for an image; determining a component of the dot pattern to be embedded on the basis of the image that has undergone error diffusion; and embedding the dot pattern in the image that has undergone error diffusion using the determined component is disclosed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view showing on-dot patterns corresponding to on-dot data;

FIG. 7 is a view for explaining density maintaining processing;

FIG. 9C is a graph that plots the distribution of the power P in the radial direction of the circle shown in FIG. 9B;

FIG. 11 is a view showing on-dot patterns;

FIG. 12 is a view showing states wherein dot patterns are embedded in the color component image shown in FIG. 8A using the on-dot patterns shown in FIG. 11;

FIGS. 16A to 16C are views showing images obtained by embedding dot patterns in the color component images shown in FIGS. 15A to 15C without considering the texture;

FIG. 17 is a view showing on-dot patterns to be added to the color component images shown in FIGS. 15A to 15C in the second embodiment;

FIGS. 18A to 18C are views showing color component images in which dot patterns are embedded using the on-dot patterns shown in FIG. 17;

FIG. 19 is a view showing on-dot patterns to be added to the color component images shown in FIGS. 15A to 15C in the third embodiment; and FIGS. 20A to 20C are views showing color component images in which dot patterns are embedded using the on-dot patterns shown in FIG. 19.

DETAILED DESCRIPTION OF THE PREFERRED EMBODIMENTS

Image processing according to embodiments of the present inventions will be described below in detail with reference to the accompanying drawings.

First Embodiment

[Arrangement]

The outline of information (to be referred to as "added information" hereinafter) printing (embedding) processing using a dot pattern will be described.

Figure 1:
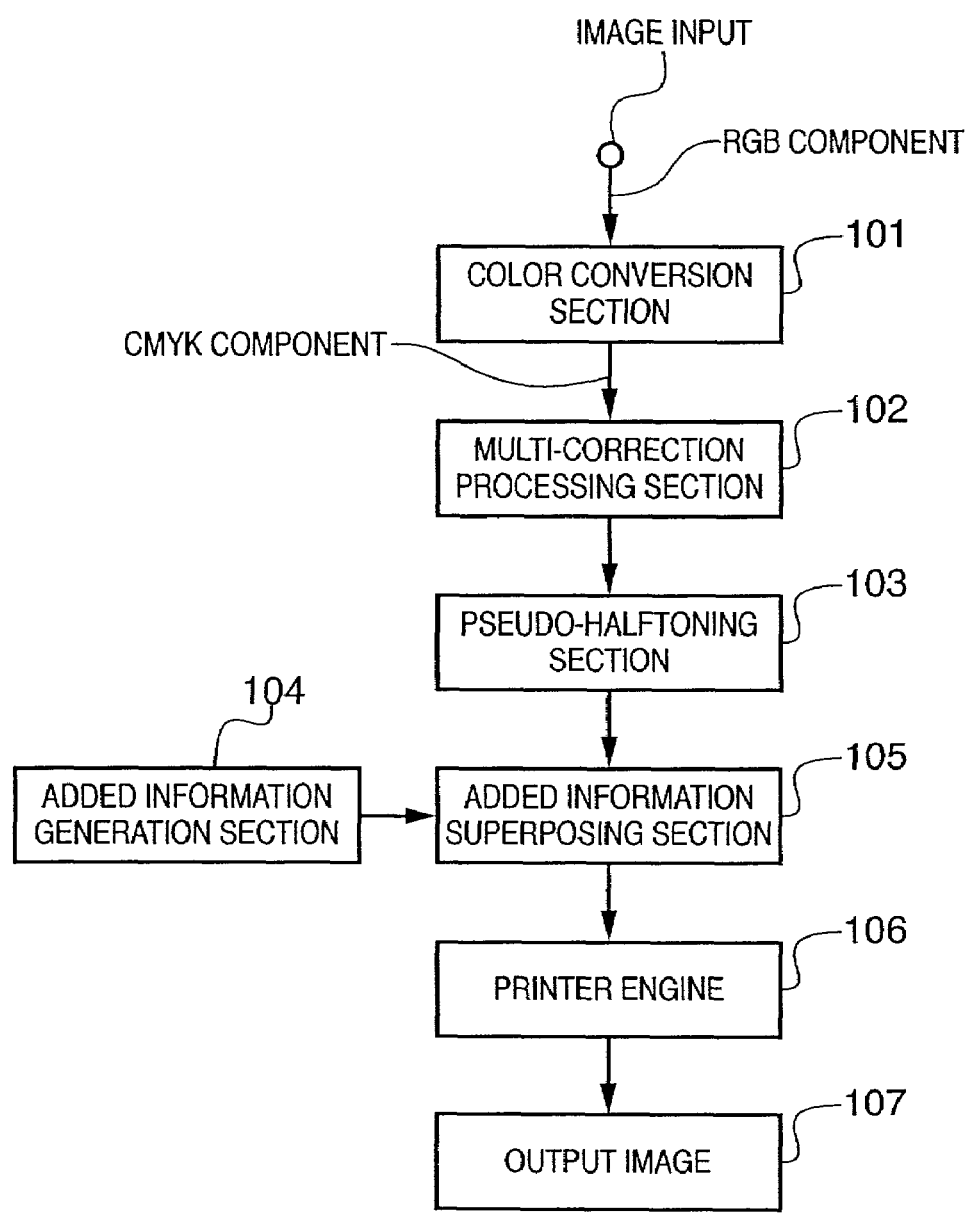
FIG. 1 is a block diagram showing added information embedding processing.

FIG. 1 is a block diagram showing added information embedding processing. Referring to FIG. 1, an input image signal represented by R, G, and B color components is converted into four color components, i.e., C (cyan), M (magenta), Y (yellow), and K (black) by a color conversion section 101. Each color component is subjected to correction processing by a multi-correction processing section 102.

Next, a pseudo-halftoning section 103 executes pseudo-halftoning using systematic dithering or error diffusion. On the other hand, an added information generation section 104 generates added information on the basis of the ID of the printer main body or user information. The generated added information is superposed on the Y color component by an added information superposing section 105. The C, M, Y, and K color components are input to a printer engine 106. Then, an image 107 in which the added information other than the image information is embedded is printed.

Figure 2:
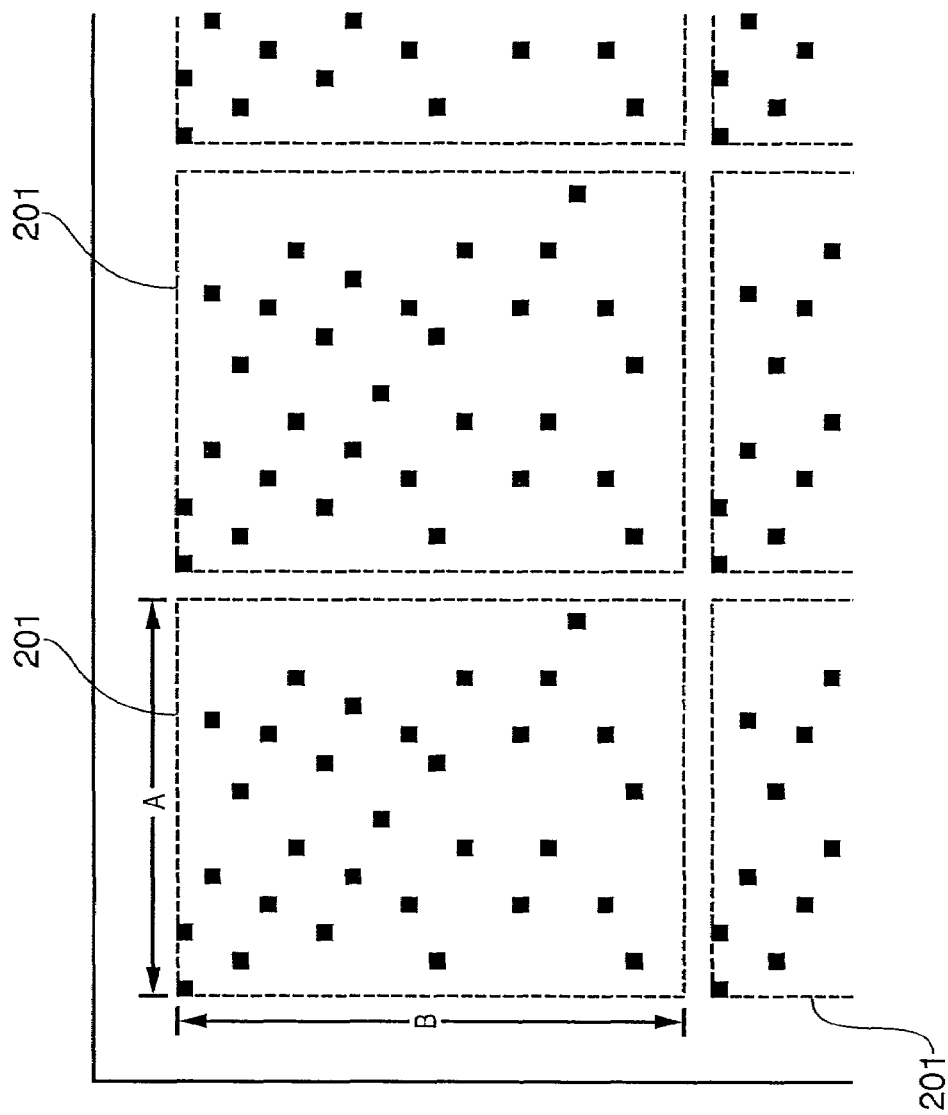
FIG. 2 is a view showing a specific dot pattern added to a yellow plane.

FIG. 2 is a view showing a specific dot pattern added to a yellow plane.

Figure 3:
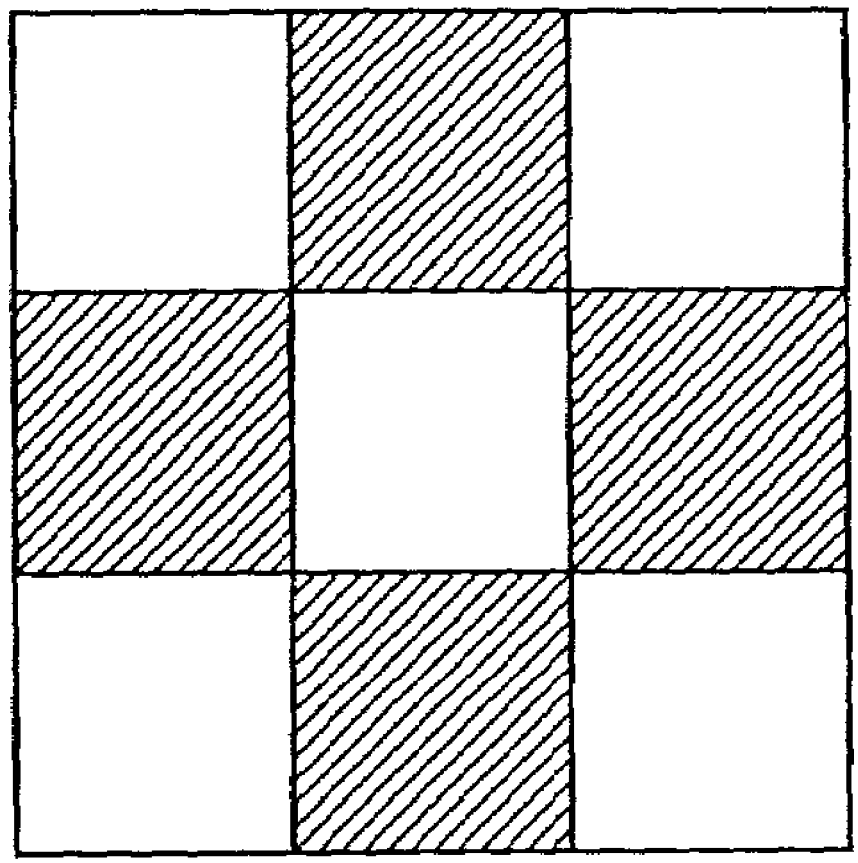
FIG. 3 is a view showing an on-dot pattern.
Figure 4:
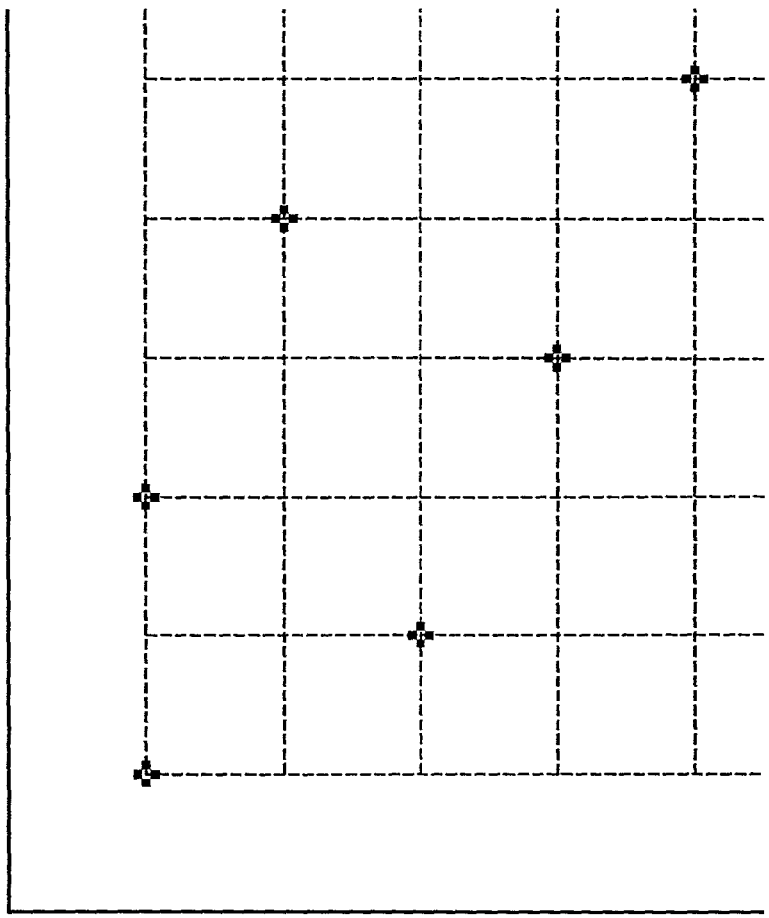
FIG. 4 is an enlarged view of FIG. 2.

Referring to FIG. 2, an A×B inch area 201 indicated by broken lines is called an "information area". Added information is expressed by a dot pattern in the area 201. The information areas continuously and periodically exist, as shown in FIG. 2. Each pixel indicated by symbol (■) in FIG. 2 is formed from 3×3 dots shown in FIG. 3. An enlarged view of FIG. 2 is shown in FIG. 4.

Symbol (■) shown in FIG. 4 indicates a dot (to be referred to as an "on-dot" hereinafter) of a dot pattern printed on a printing paper sheet with yellow ink or yellow toner.

Figure 5:
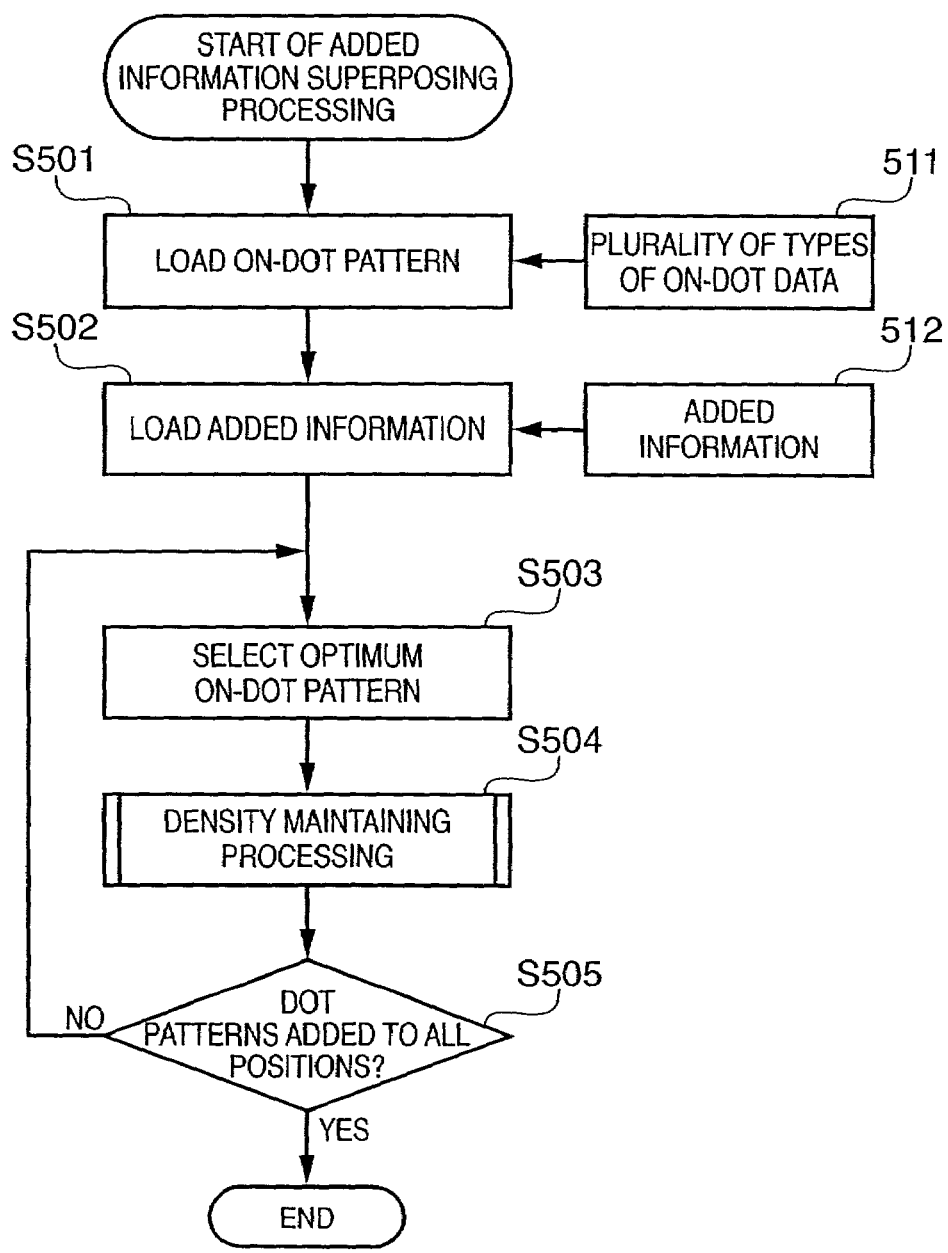
FIG. 5 is a flow chart showing the flow of processing in an added information superposing section.

The added information superposing section 105 shown in FIG. 1 will be described here in more detail. FIG. 5 is a flow chart showing the flow of processing in the added information superposing section 105.

In step S501, a plurality of kinds of on-dot data 511 prepared in advance (stored in a memory) are loaded. FIG. 6 is a view showing on-dot patterns corresponding to the on-dot data 511. FIG. 6(a) shows an on-dot pattern for a low density, FIG. 6(b) shows an on-dot pattern for a medium density, and FIG. 6(c) shows an on-dot pattern for a high density. This description will be done assuming that the printer has a function of selectively printing a high-density dot (to be referred to as a "dark dot" hereinafter) or a low-density dot (to be referred to as a "light dot" hereinafter). Hence, a low- or medium-density on-dot is printed by a light dot, and a high-density on-dot is printed by a dark dot.

In step S502, added information 512 is loaded. In step S503, the density of a color component image near the on-dot adding position is estimated, and a suitable on-dot pattern is selected from the three on-dot patterns. In step S504, density maintaining processing is executed to keep the density of the color component image near the on-dot adding position unchanged from that before addition of the on-dot, and the on-dot is added. Steps S503 and S504 are repeated until it is determined in step S505 that the on-dots are added to all on-dot adding positions.

The density maintaining processing in step S504 will be described in more detail.

FIG. 7 is a view for explaining the density maintaining processing. FIG. 7(a) shows a color component image which has undergone pseudo-halftoning. FIG. 7(b) shows a color component image obtained by adding on-dots (FIG. 6(b)) without executing the density maintaining processing. Referring to FIG. 7(b), the density increases near the added on-dots. Hence, even when the unnoticeable yellow color is used, unnaturally visible dots may be formed to degrade the quality of the output image.

To suppress formation of unnatural dots, dots that are present in FIG. 7(a) are set off (dots are not formed) near the on-dot adding positions to prevent the number of formed dots from changing after addition of the on-dots. With this operation (density maintaining processing), the color component image shown in FIG. 7(c) is obtained, in which formation of unnatural dots is suppressed as compared to FIG. 7(b).

[Optimizing On-Dot Pattern]

In the first embodiment, an optimum on-dot pattern shape is determined by evaluating the influence of on-dot addition on the image quality in the frequency domain.

Figure 8A:
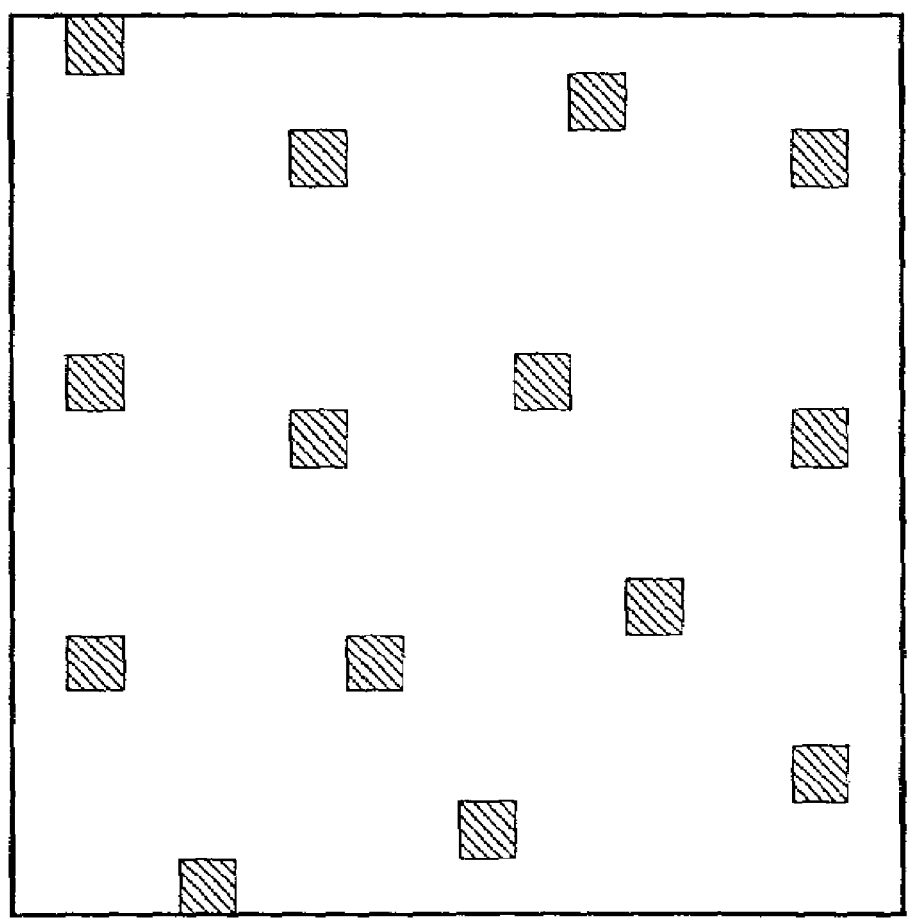
FIG. 8A is a view showing a color component image after pseudo-halftoning.
Figure 8B:
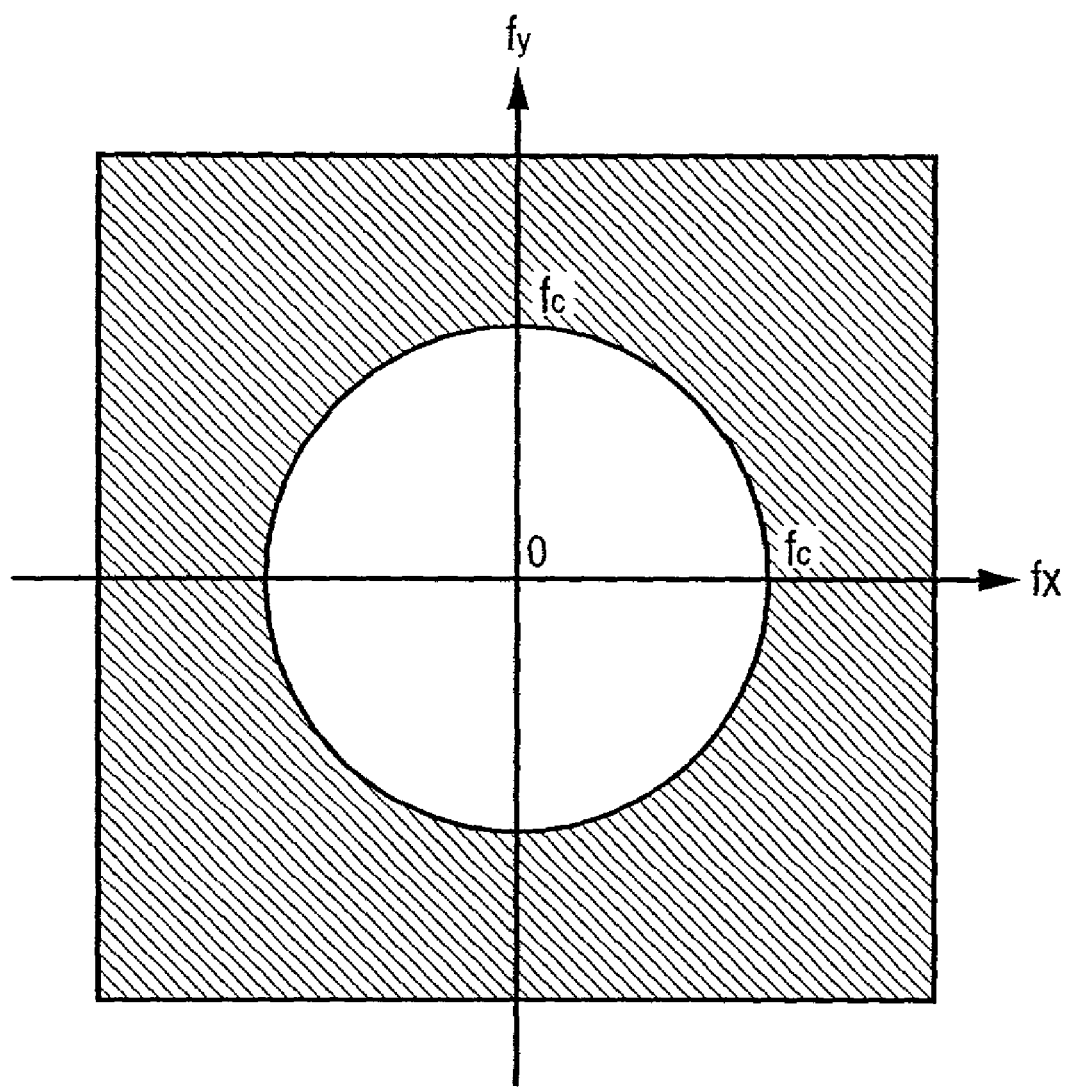
FIG. 8B is a view showing the two-dimensional Fourier power spectrum of the color component image shown in FIG. 8A.

FIG. 8A is a view showing a color component image obtained by executing pseudo-halftoning using an error diffusion filter for a color component image which has a relatively low and uniform density. FIG. 8B is a view showing the two-dimensional Fourier power spectrum of the color component image shown in FIG. 8A. In other words, FIGS. 8A and 8B show the characteristic of the error diffusion filter.

Referring to FIG. 8B, the abscissa represents a horizontal frequency fx, the ordinate represents a vertical frequency fy, and the origin represents a DC component. The area in the circle with a radius fc is an area having a relatively low power. The area outside the circle is an area having a relatively high power.

Figure 8C:
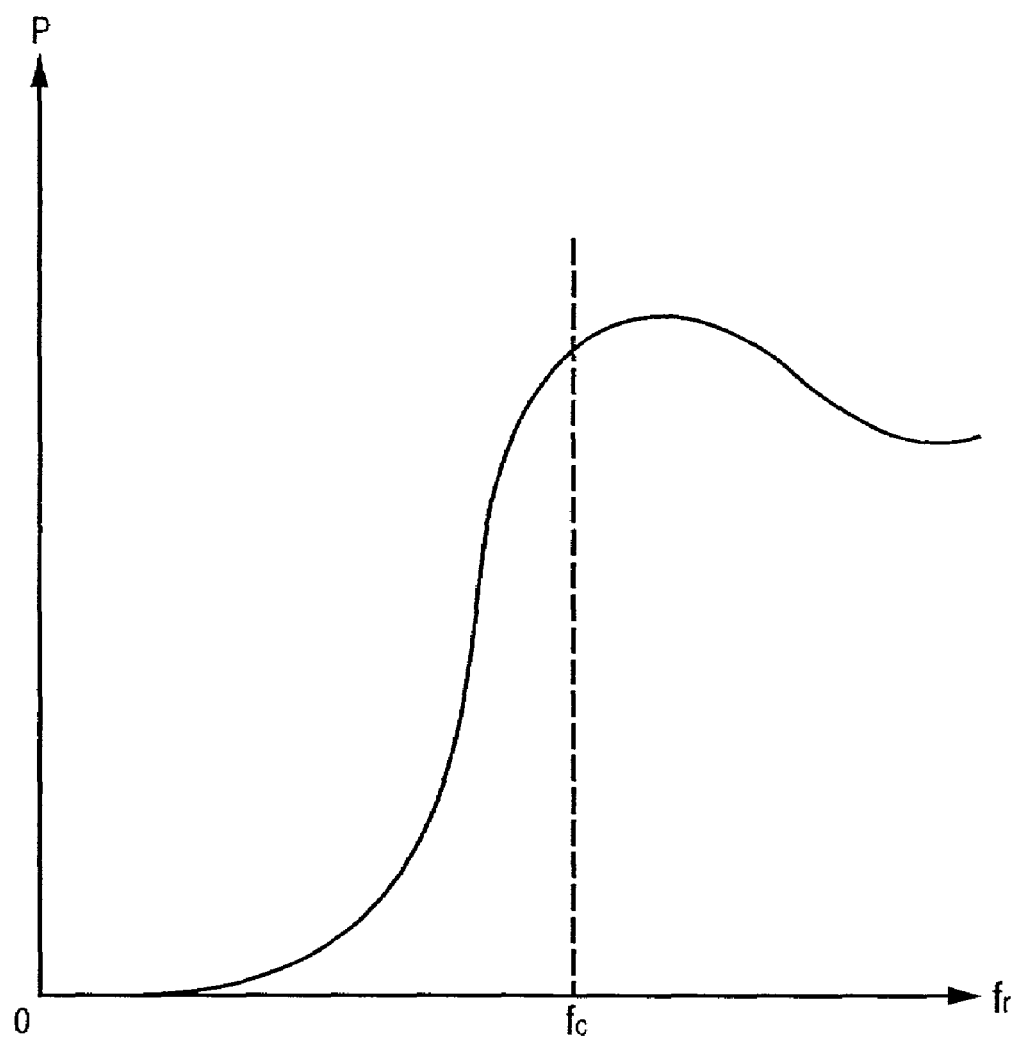
FIG. 8C is a graph that plots the distribution of a power P in the radial direction of the circle shown in FIG. 8B.

FIG. 8C is a graph that plots the distribution of a power P in the radial direction of the circle shown in FIG. 8B. Referring to FIG. 8C, the ordinate represents the power P, the abscissa represents a radial frequency fr, and the origin represents the center of FIG. 8B. As is apparent from FIG. 8C, the error diffusion filter has a high-pass characteristic using the frequency fc as a cutoff frequency.

Figure 9A:
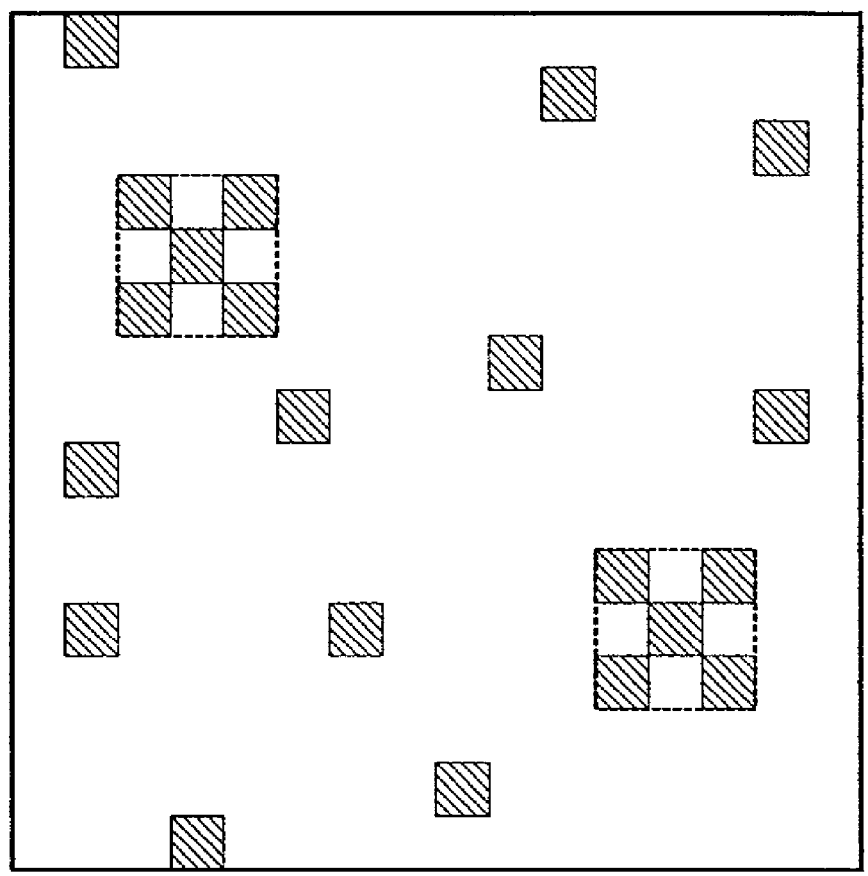
FIG. 9A is a view showing a color component image obtained by adding the on-dot shown in FIG. 6(b), which is formed from 3×3 dots, to the color image component shown in FIG. 8A.

FIG. 9A is a view showing a color component image obtained by adding the on-dot shown in FIG. 6(b), which is formed from 3×3 dots, to the color image component shown in FIG. 8A. Note that the above-described density maintaining processing is executed in adding the on-dots.

Figure 9B:
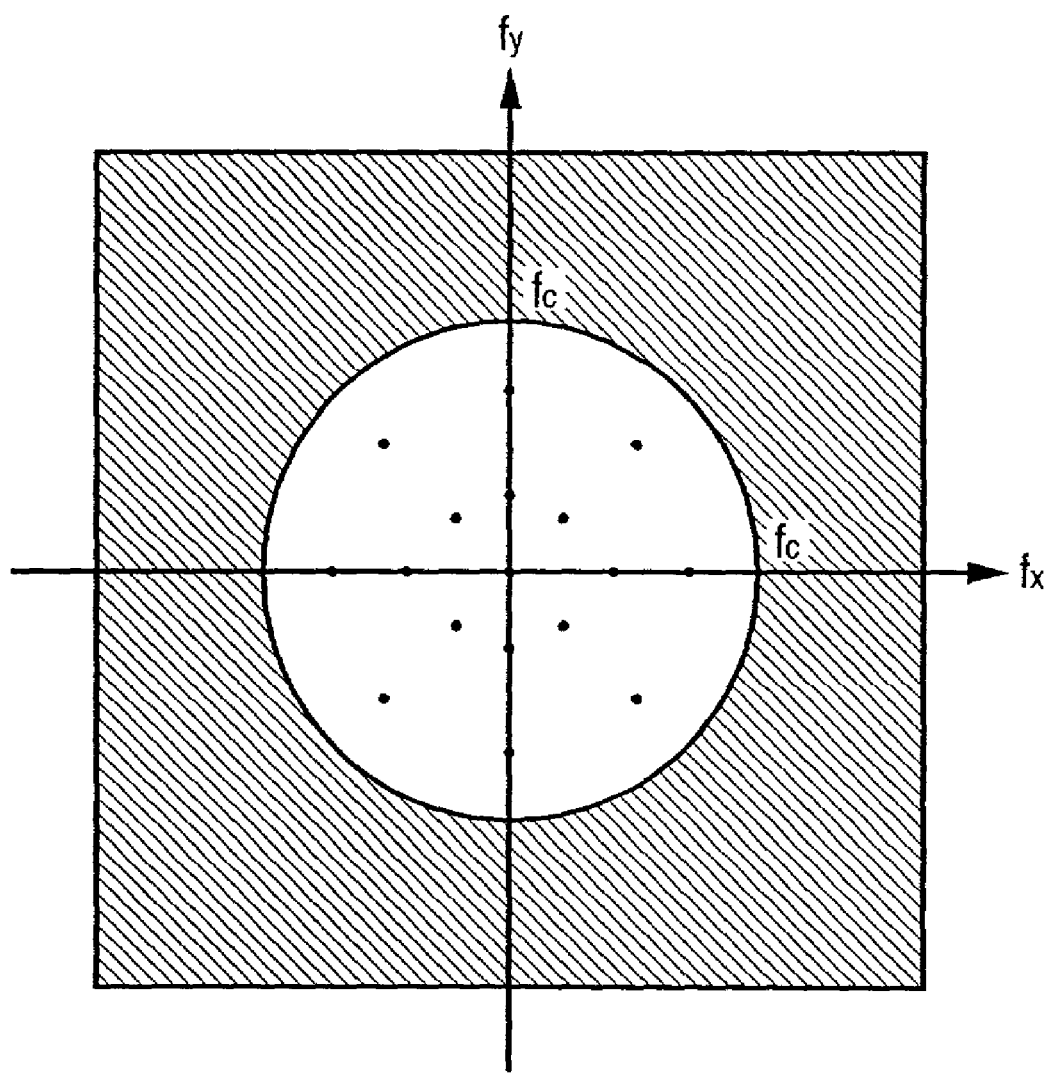
FIG. 9B is a view showing the two-dimensional Fourier power spectrum of the color component image shown in FIG. 9A.

FIG. 9B is a view showing the two-dimensional Fourier power spectrum of the color component image shown in FIG. 9A. As is apparent from FIG. 9B, when the on-dots are added, the power P increases in the low-frequency domain. FIG. 9C is a graph that plots the distribution of the power P as in FIG. 8C. The power P mainly increases in the low-frequency domain probably because the on-dot pattern shown in FIG. 6(b) has oblique dot connection.

In embedding a dot pattern in an image as a code that expresses certain information and extracting the information from the printed image using an image reading apparatus such as a scanner, in order to increase the information detection accuracy while suppressing the degradation in image quality due to dot pattern embedding, the density of dots of the dot pattern must be increased to some extent. However, if the dot pattern as shown in FIG. 9A is used, the power in the low-frequency domain increases because the dot density of the dot pattern to be embedded is higher than the pixel density of the image near the on-dot adding position. The human visual characteristic is supposed to have a high sensitivity to a low-frequency component. Hence, any unnecessary increase in power in the low-frequency domain considerably degrades the image quality.

To the contrary, when a dot pattern that generates no unnecessary increase in power in the low-frequency domain is embedded, the image quality hardly degrades because of the human visual characteristic. In the first embodiment, an appropriate on-dot pattern shape that causes no unnecessary increase in power in the low-frequency domain of the color component image as shown in FIG. 8A is determined by on-dot pattern shape determination processing (to be described later).

Figure 10:
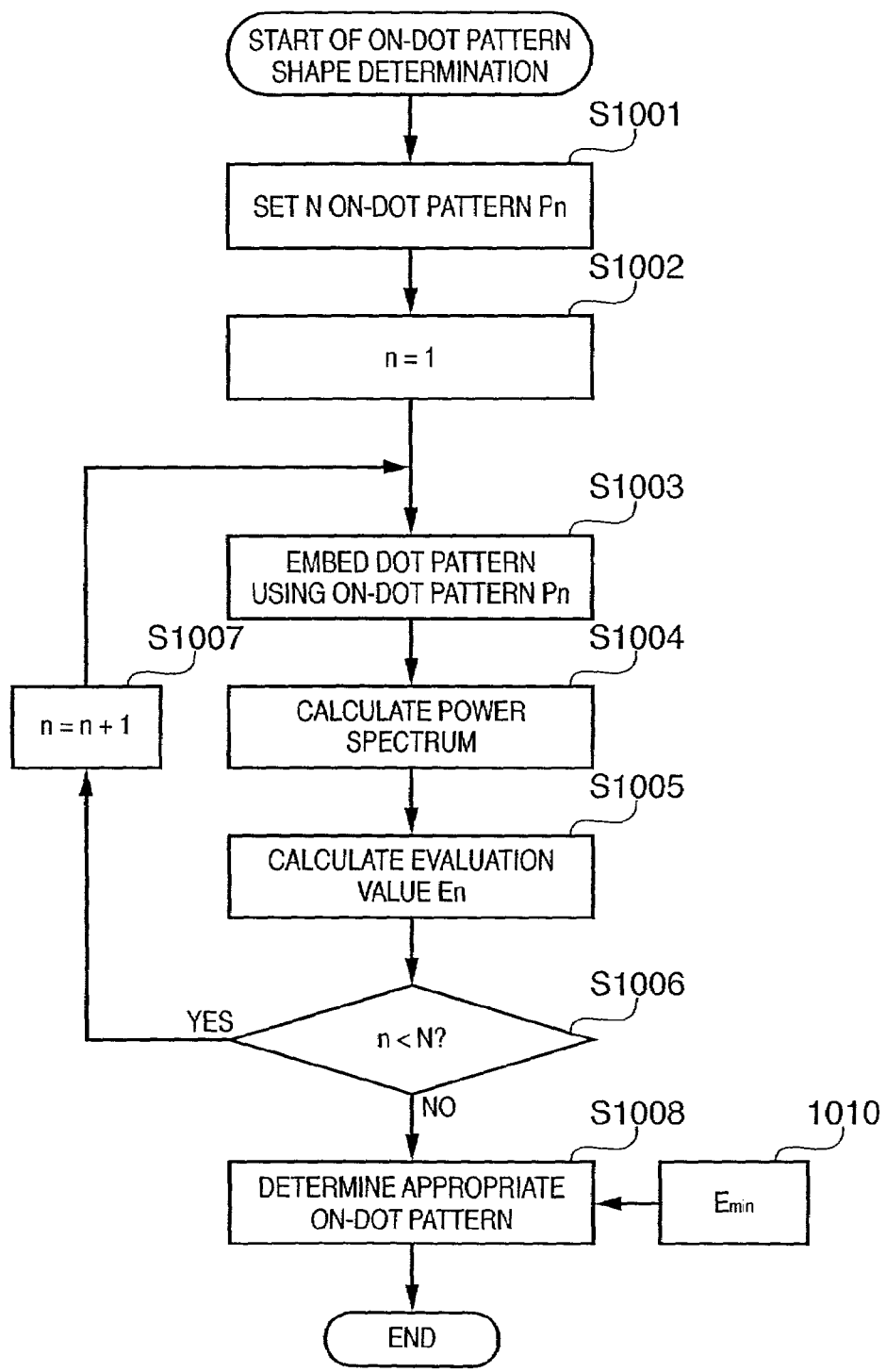
FIG. 10 is a flow chart for explaining on-dot pattern shape determination processing.

FIG. 10 is a flow chart for explaining on-dot pattern shape determination processing according to the first embodiment. This processing is executed in, e.g., step S503 shown in FIG. 5 where an optimum pattern is selected.

In step S1001, N ($\geq$1) types of dot patterns are prepared as candidates for an appropriate on-dot pattern. That is, on-dot pattern candidates are selected from the on-dot patterns loaded in step S501. As the on-dot pattern candidates, several (N) types of on-dot patterns are selected on the basis of the above-described density of the color component image near the adding position. For the following description, assume that three different on-dot patterns P1 to P3 shown in FIG. 11 is selected.

In step S1002, a counter n=1 is set. In step S1003, a dot pattern is embedded in the color component image using an on-dot pattern Pn corresponding to the counter n. In step S1004, the image having the embedded dot pattern is converted into a frequency domain using Fourier transform or the like, and the power spectrum of the image is obtained.

FIGS. 12 is a view showing states wherein dot patterns are embedded in the color component image shown in FIG. 8A using the three different on-dot patterns P1 to P3 shown in FIG. 11. Let i (x, y) be the image before the dot pattern is embedded, $i_{Pn}$ (x, y) be the image having the dot pattern embedded using the on-dot pattern Pn, and I (fx, fy) and $I_{Pn}$ (fx, fy) be the images obtained by converting these images into frequency domains. Then, power spectra S (fx, fy) and $S_{Pn}$ (fx, fy) of the images are given by $$S(fx,fy)=|I(fx,fy)|^2 \quad (1.1)$$

$$S_{Pn}(fx,fy)=|I_{Pn}(fx,fy)|^2 \quad (1.2)$$

Next, in step S1005, an evaluation value En that evaluates the degradation in image quality when the dot pattern is embedded by the on-dot pattern Pn is obtained using the resultant power spectra.

$$En=\Sigma_{fr<fmax}|S_{Pn}(fx,fy)-S(fx,fy)|$$

$$\text{for } fr=\sqrt{(fx^2+fy^2)} \quad (1.3)$$

That is, the evaluation value En is obtained by calculating the difference between the power spectra obtained by equations (1.1) and (1.2) and totalizing the difference values within the range of fr<fmax. The value fmax represents the upper limit of the frequency range used to calculate the difference value. The cutoff frequency fc or any other arbitrary frequency can be used as fmax.

Processing in steps S1003 to S1005 is repeated, and the value N is incremented in step S1007 until it is determined in step S1006 that n=N.

Figure 13:
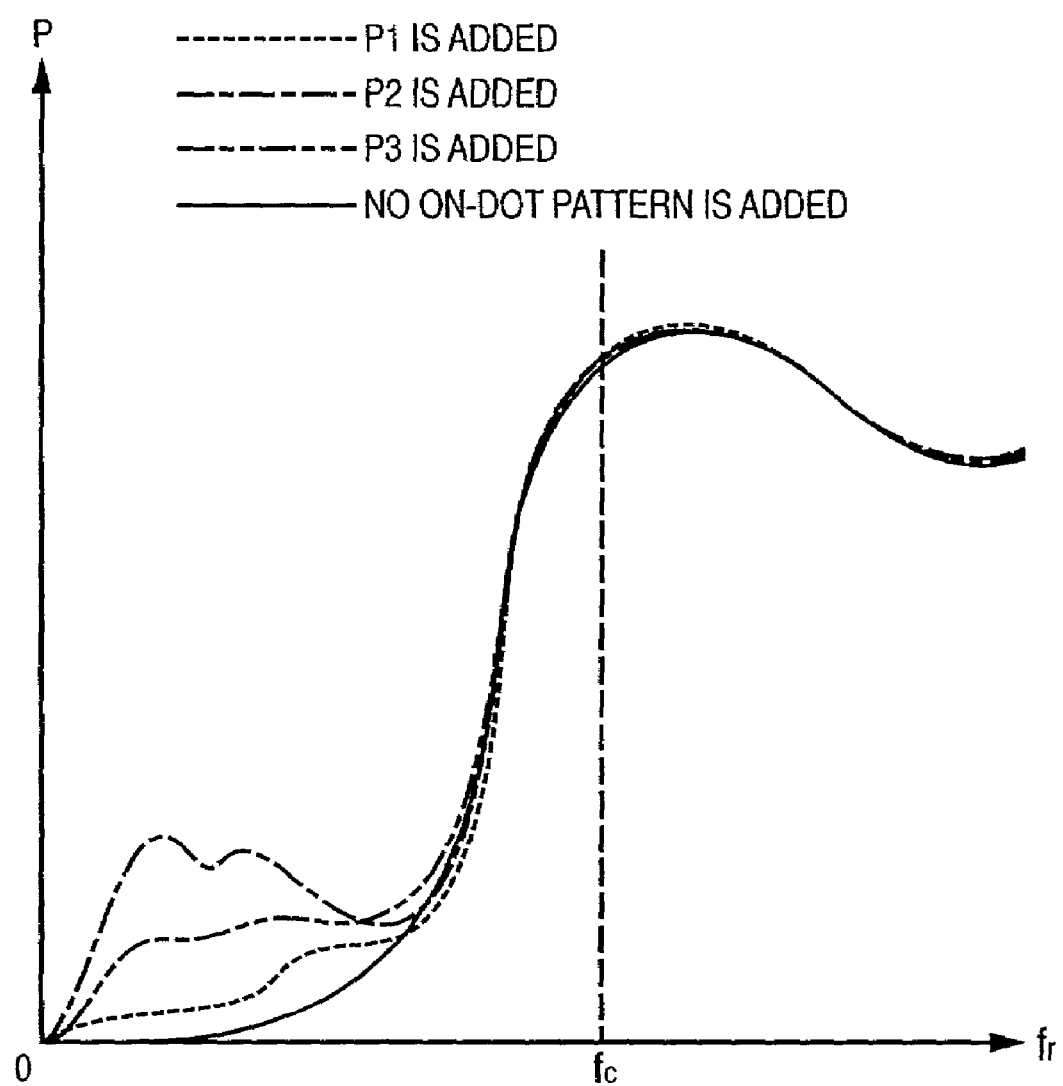
FIG. 13 is a graph showing the two-dimensional Fourier power spectra of the color component images shown in FIG. 12.

FIG. 13 is a graph showing the two-dimensional Fourier power spectra of the color component images shown in FIG. 12. When the images having dot patterns embedded by the on-dot patterns P1 to P3 have frequency characteristics as shown in FIG. 13, evaluation values E1 to E3 obtained by equation (1.3) have a relationship given by $$E1<E2<E3 \quad (1.4)$$

In step S1008, an appropriate on-dot pattern is determined on the basis of the evaluation value En. To suppress any degradation in image quality due to dot pattern embedding, the on-dot pattern P1 having the smallest evaluation value En can be optimally used. However, that the evaluation value En is small also means that the shape of the on-dot pattern Pn is similar to the dot layout of the image. Hence, it is more difficult to detect the added information from the printed image by a reading apparatus. To prevent this, in the first embodiment, a lower limit value Emin 1010 is prepared. Any on-dot pattern that satisfies En<Emin is not employed. The lower limit value Emin is preset in accordance with the characteristic of the error diffusion filter or the density state of the image.

For example, if the evaluation value E1 of the on-dot pattern P1 is smaller than the lower limit value Emin, the on-dot pattern P1 is not employed. As a consequence, the on-dot pattern P2 is employed as an appropriate dot pattern for the color component image shown in FIG. 8A. If E1<E2$\leq$Emin, the on-dot pattern P3 is employed.

As described above, in adding a dot pattern to an image, if an on-dot pattern is selected such that an increase in power in the low-frequency domain is minimized, the dot pattern can be embedded with less degradation in image quality.

Processing in an area having a relatively low image density has been described above. With the same processing as described above, an appropriate on-dot pattern can be determined even for an area having a high image density.

Second Embodiment

Image processing according to the second embodiment of the present invention will be described below. The same reference numerals as in the first embodiment denote almost the same components in the second embodiment, and a detailed description thereof will be omitted.

In the first embodiment, a method of evaluating the influence of dot pattern embedding on an image in the frequency domain and determining an appropriate on-dot pattern shape on the basis of the evaluation result has been described. In the second method, a method of determining an appropriate on-dot pattern shape on a real space in accordance with the texture of an image will be described.

Figure 14:
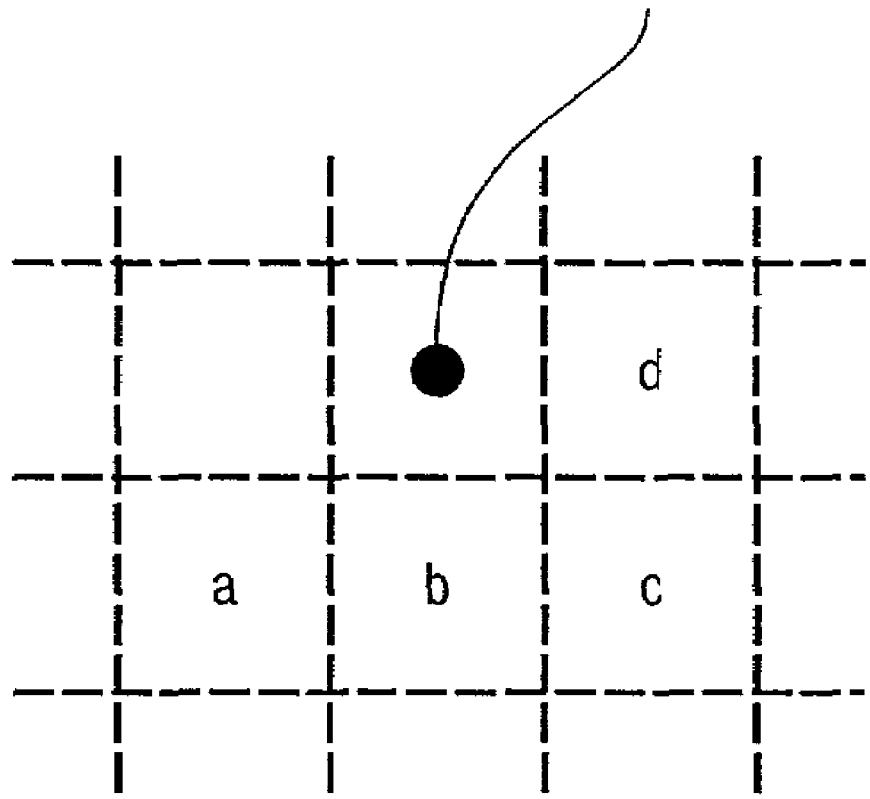
FIG. 14 is a view showing a general error diffusion filter used for pseudo-halftoning.

FIG. 14 is a view showing a general error diffusion filter used for pseudo-halftoning. Symbol (●) indicates a pixel to be quantized. Peripheral pixels with error diffusion coefficients a to d are pixels to which an error will be diffused (to be referred to as "error diffusion pixels" hereinafter).

In error diffusion, the difference value between a pixel value quantized at a given threshold value and a pixel value before quantization is weighted by the error diffusion coefficients a to d and distributed (added) to error diffusion pixels. Generally, when the error diffusion range is wide, generated dots are uniformly distributed. However, error diffusion in a very wide range is impossible from the viewpoint of processing speed. An error is distributed to about four pixels, as shown in FIG. 14. For this reason, the image after error diffusion has a chain-like or peculiar texture.

Figure 15A:
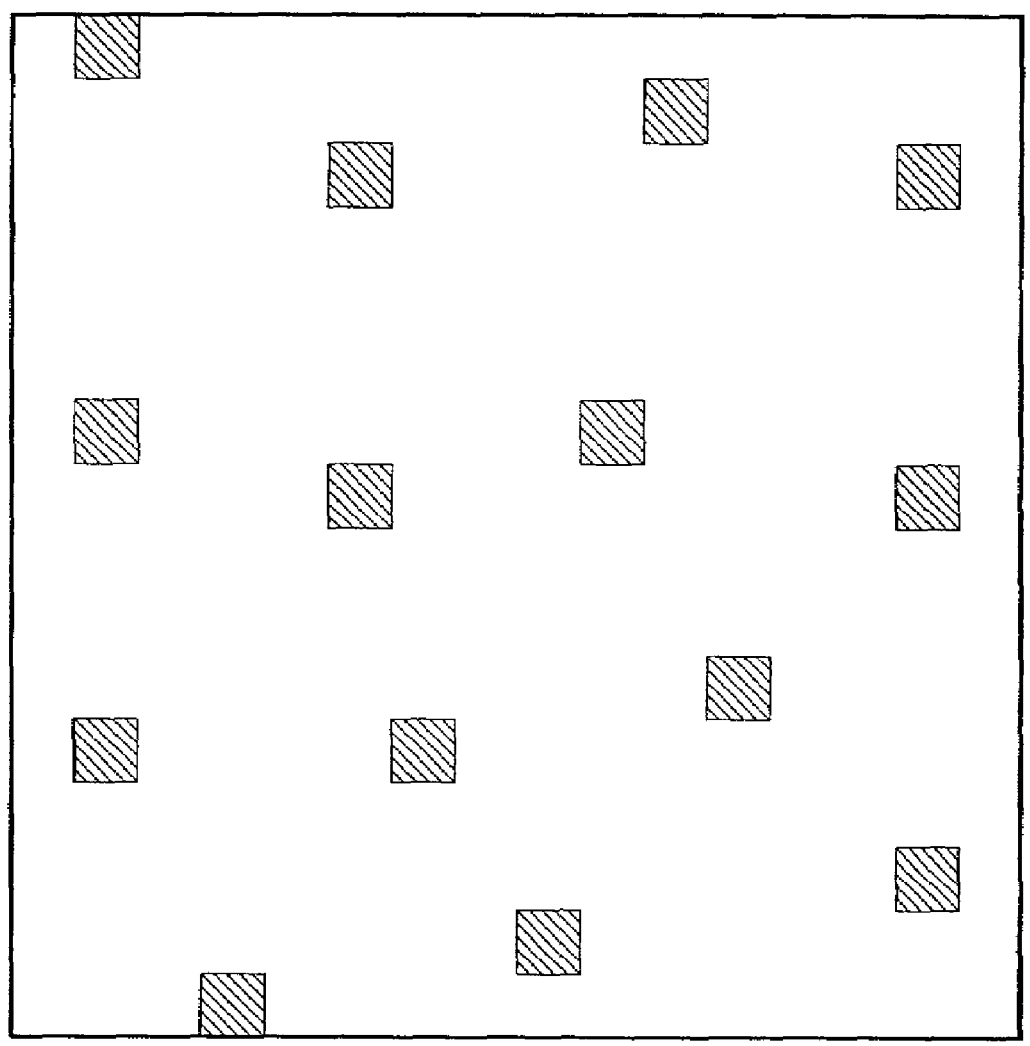
FIGS. 15A to 15C are views showing color component images after error diffusion.
Figure 15B:
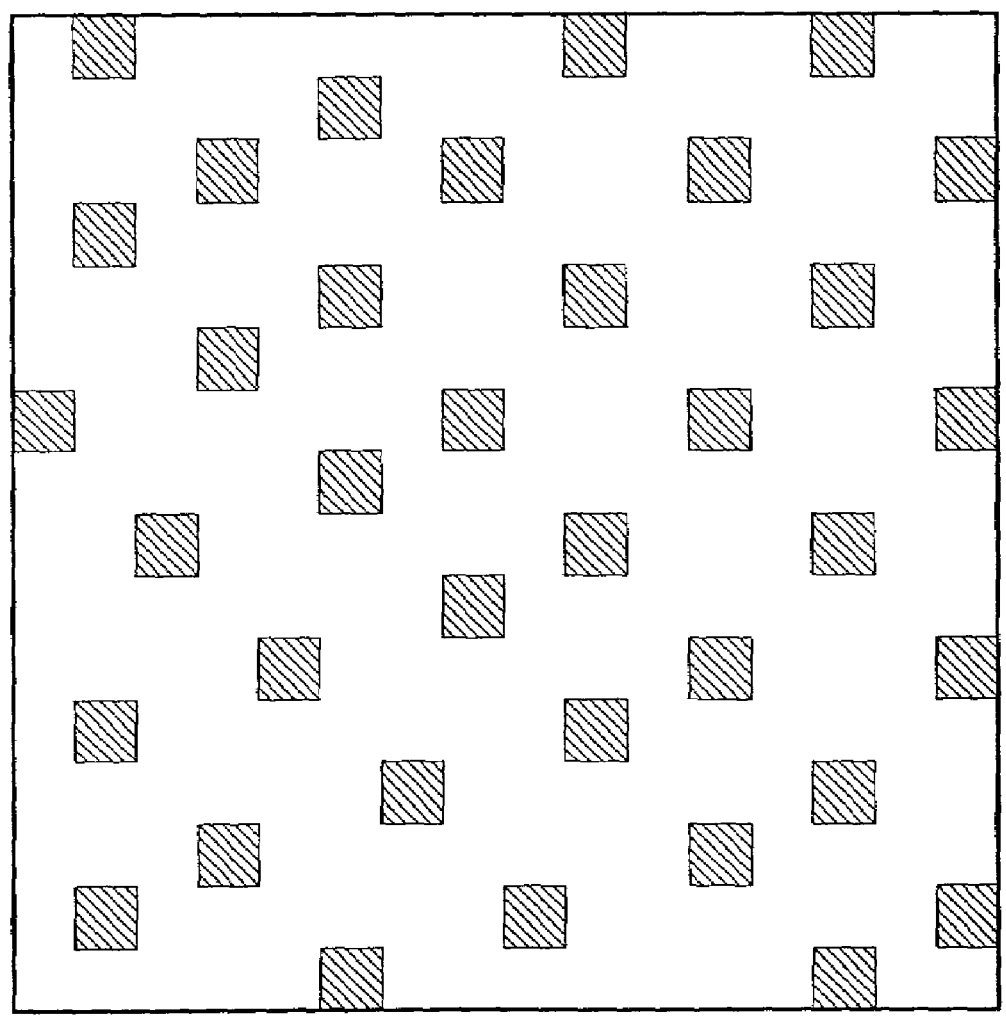
Figure 15C:
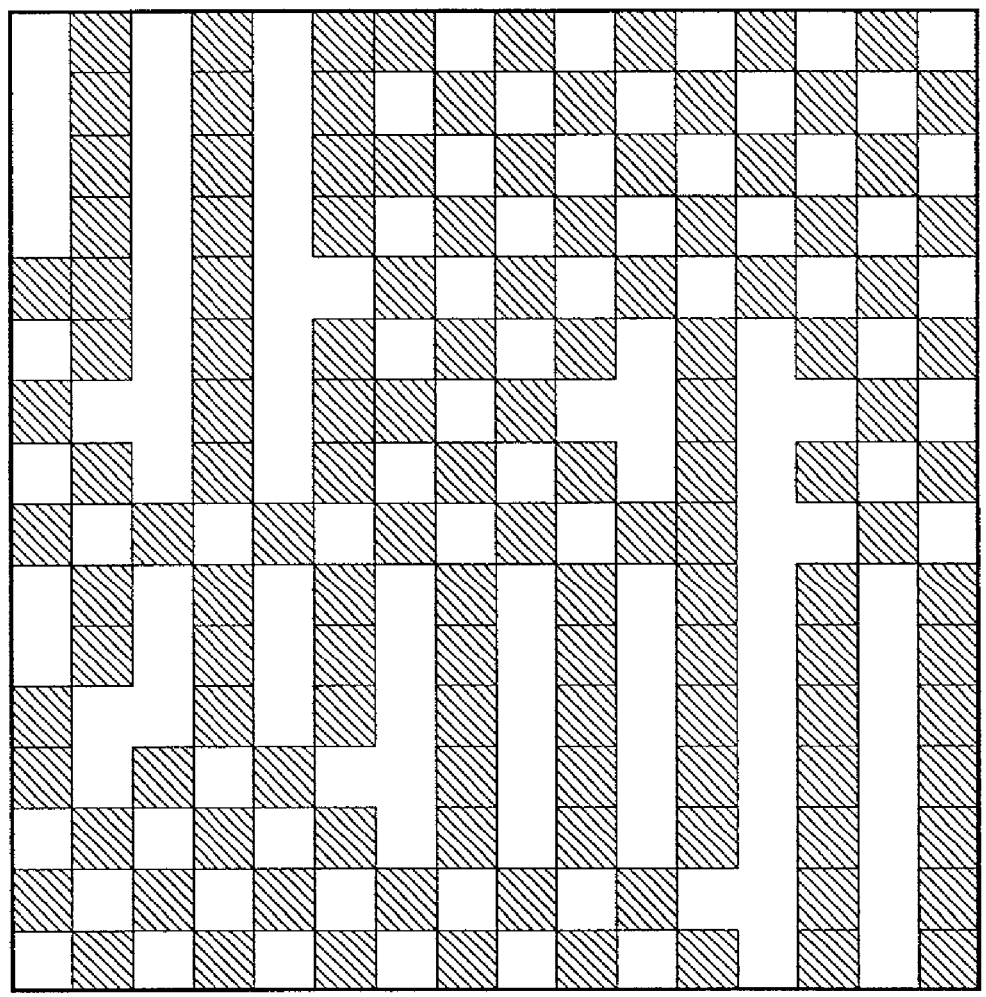
Figure 16A:
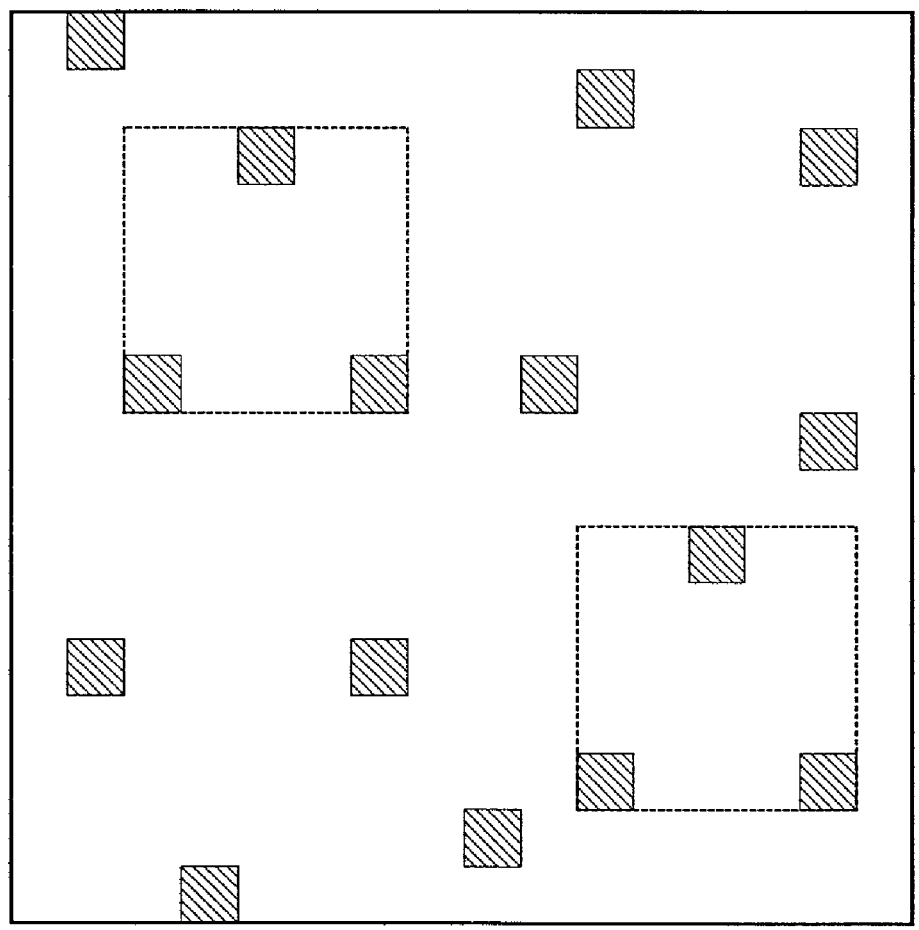
Figure 16B:
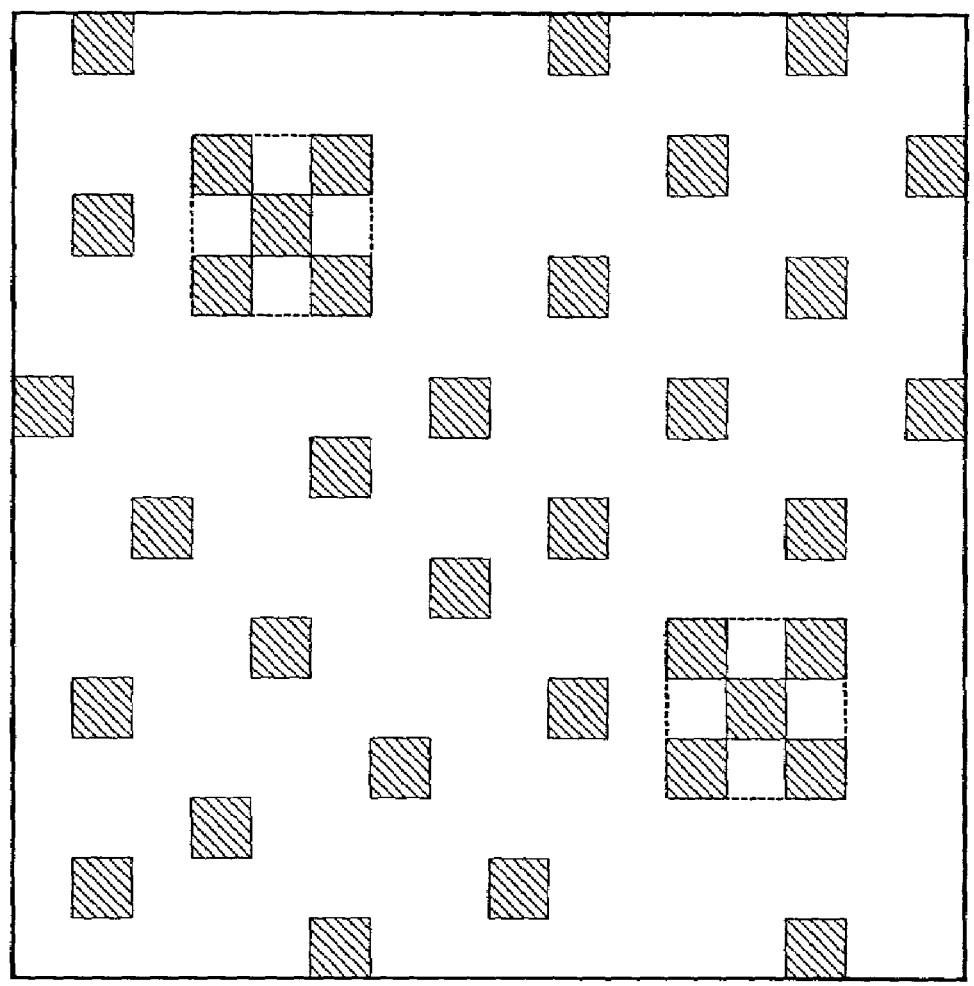

FIGS. 15A to 15C are views showing color component images after error diffusion. FIG. 15A shows an area having a relatively low density after error diffusion in which no peculiar texture is observed. On the other hand, a diagonal texture downward from the upper left is observed in FIG. 15B (medium density area). A texture with vertically connected dots is observed in FIG. 15C (high density area). When dot patterns are embedded in the color component images shown in FIGS. 15A to 15C without considering the texture, images shown in FIGS. 16A to 16C are obtained.

In the second embodiment, a dot pattern is embedded in consideration of texture formation by error diffusion. In the second embodiment as well, an error diffusion filter is used for pseudo-halftoning, and the printer is assumed to be able to selectively print a dark dot or a light dot.

FIGS. 17 is a view showing on-dot patterns to be added to the color component images shown in FIGS. 15A to 15C in the second embodiment.

Since no peculiar texture is observed in the color component image shown in FIG. 15A, the on-dot pattern shown in FIG. 17(a) is used. Since a diagonal texture downward from the upper left is observed in the color component image shown in FIG. 15B, the on-dot pattern for a medium density shown in FIG. 17(b), which is formed from three light dots laid out in the same direction as that of the texture, is used. Since a vertical texture is observed in the color component image shown in FIG. 15C, the on-dot pattern for a high density shown in FIG. 17(c), which is formed from three dark dots laid out in the same direction as that of the texture, is used.

Figure 18A:
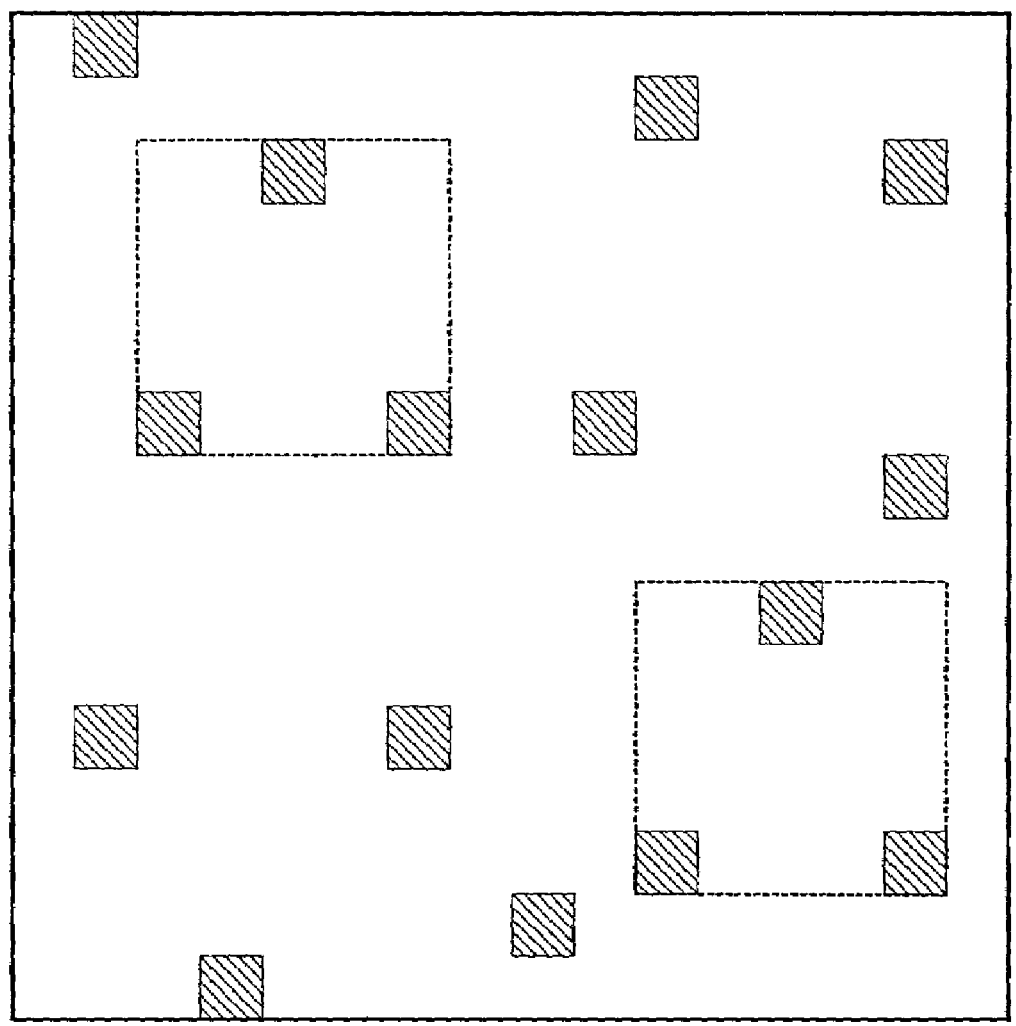
Figure 18B:
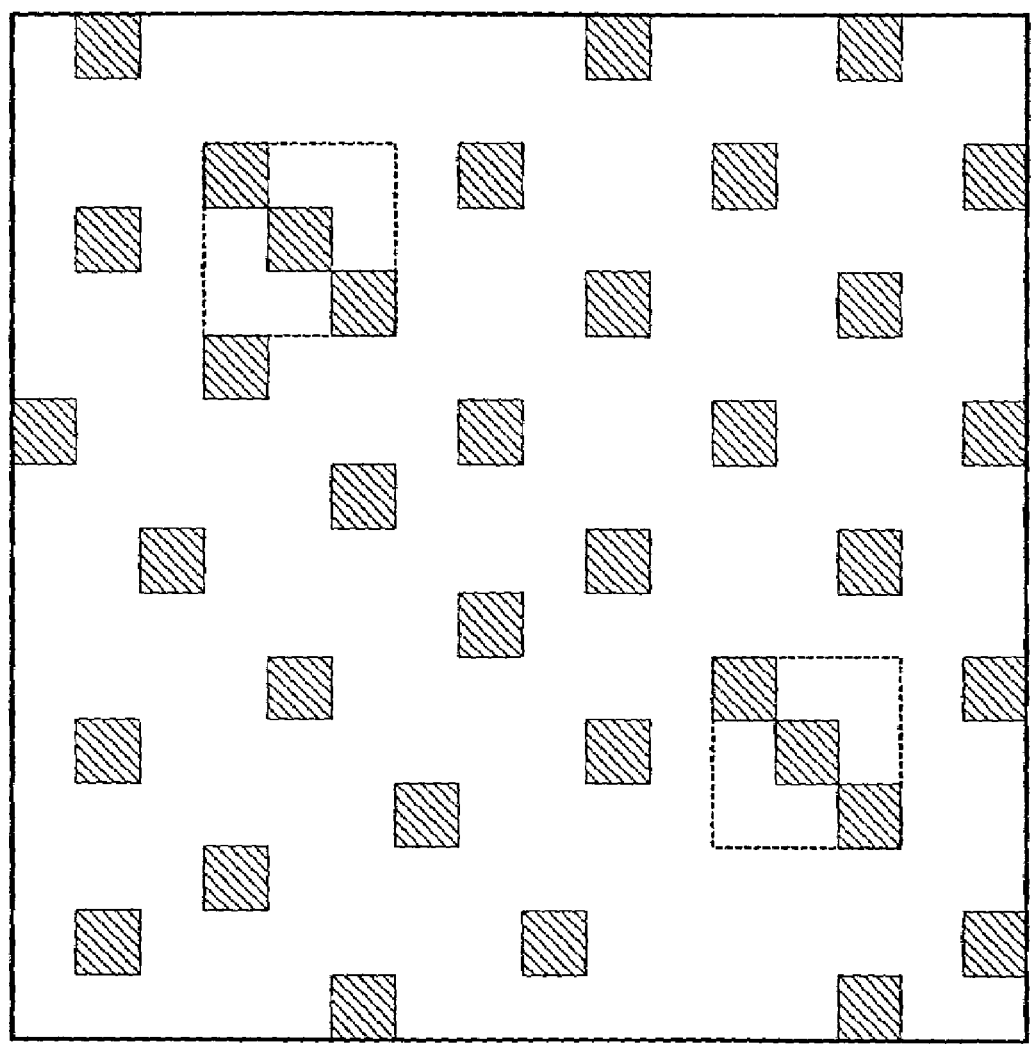

FIGS. 18A to 18C are views showing color component images in which dot patterns are embedded using the on-dot patterns shown in FIG. 17. As shown in FIGS. 18A to 18C, when an on-dot pattern having a shape corresponding to the direction of texture formed by error diffusion is determined and added to each density area, the dot pattern can be embedded in the image while suppressing the influence on the image quality.

Third Embodiment

Image processing according to the third embodiment of the present invention will be described below. The same reference numerals as in the first embodiment denote almost the same components in the third embodiment, and a detailed description thereof will be omitted.

In the second embodiment, an example in which an on-dot pattern corresponding to the direction of texture is used in consideration of a texture formed by error diffusion has been described. According to the second embodiment, a dot pattern can be embedded in an image while suppressing the influence on the image quality. However, it may be difficult to detect the added information from a printed image using a reading apparatus because the direction of texture matches or resembles the direction of on-dot pattern.

In the third embodiment, on-dot patterns shown in FIG. 19 are employed. The on-dot pattern shown in FIG. 19(a) is used for the low-density image shown in FIG. 15A. The on-dot pattern shown in FIG. 19(b) is used for the medium-density image shown in FIG. 15B. The on-dot pattern shown in FIG. 19(c) is used for the high-density image shown in FIG. 15C.

Figure 20B:
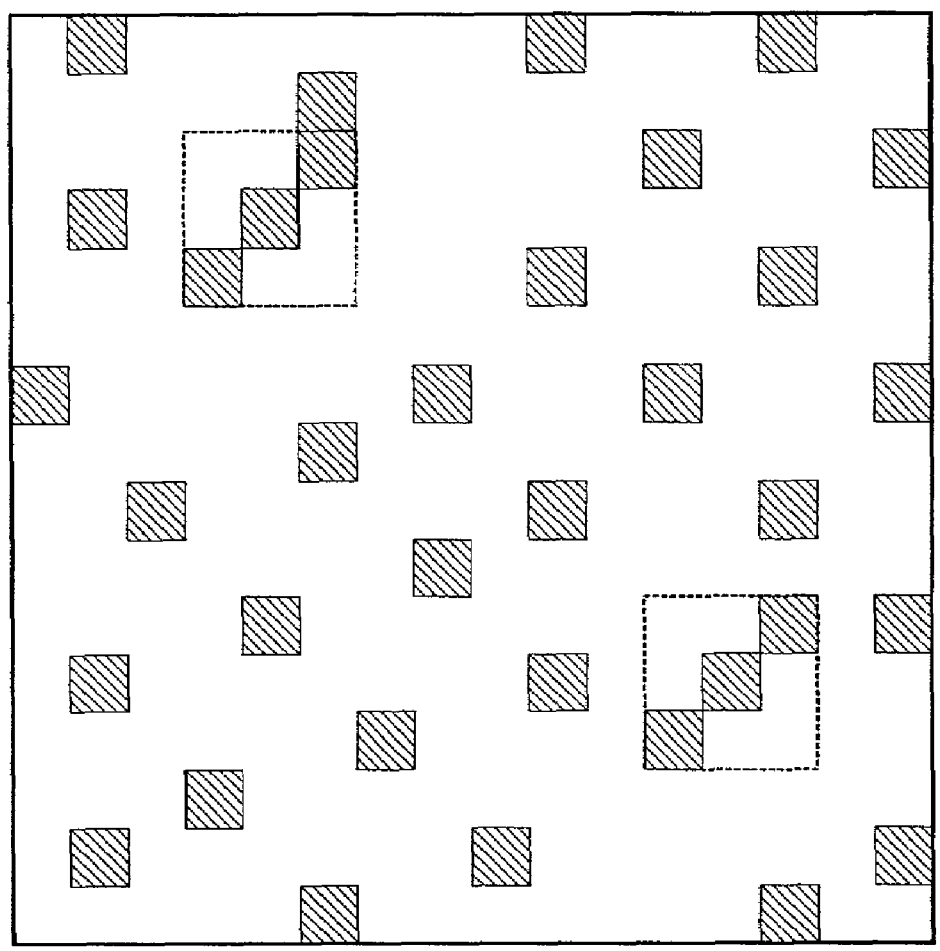

FIGS. 20A to 20C are views showing color component images in which dot patterns are embedded using the on-dot patterns shown in FIG. 19. As shown in FIGS. 20A to 20C, when an on-dot pattern almost perpendicular to the direction of texture formed by error diffusion is determined and added to each density area, the dot pattern can be embedded in the image while suppressing the influence on the image quality to almost the intermediate level between the case wherein the texture is not taken into consideration (FIGS. 16A to 16C) and the second embodiment (FIGS. 18A to 18C and increasing the added information detection accuracy.

Processing of the second and third embodiments is executed in, e.g., step S503 shown in FIG. 5 where an optimum pattern is selected. In addition, the direction of texture can be known by known filtering, and a detailed description thereof will be omitted.

When a vertical (or horizontal) texture is formed in a medium-density area, each dot of the on-dot pattern shown in FIG. 17(c) (or FIG. 19(c)) is changed to a light dot, and a resultant dot pattern is employed. When a diagonal texture is formed in a high-density area, each dot of the on-dot pattern shown in FIG. 17(b) (or FIG. 19(b)) is changed to a dark dot, and a resultant dot pattern is employed.

A diagonal texture downward from the upper right or a horizontal texture may be formed depending on the structure of the error diffusion filter or processing. In that case, the on-dot patterns shown in FIG. 17 and FIG. 19 are adaptively used.

According to the above-described embodiments, in an apparatus for embedding a dot pattern which specifies the apparatus or user in an image after pseudo-halftoning in order to prevent forgery of a specific original such as a bank note or securities using a color image printing apparatus (printer or copying machine), the on-dot pattern (or its shape) to be used to embed a dot pattern is determined on the basis of the power spectrum in a frequency domain after dot pattern embedding or a texture formed by pseudo-halftoning, thereby multiplying (superposing) added information with less visual sense of incompatibility (with less degradation in image quality).

Additionally, when an on-dot pattern is selected and used in consideration of the direction of texture, the added information detection accuracy can be increased while suppressing the degradation in image quality.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for embedding a dot pattern which indicates added information, comprising:
   a halftone processor, arranged to execute error diffusion for an image;
   a determiner, arranged to determine a component of the dot pattern to be embedded on the basis of the image that has undergone error diffusion; and
   an embedding section, arranged to embed the dot pattern in the image that has undergone error diffusion using the determined component.

2. The apparatus according to claim 1, wherein said determiner determines the component on the basis of a power spectrum in a predetermined frequency domain after the dot pattern is embedded in the image that has undergone error diffusion.

3. The apparatus according to claim 1, wherein said determiner evaluates an influence of dot pattern embedding on an image quality on the basis of power spectra in a predetermined frequency domain before and after the dot pattern is embedded in the image that has undergone error diffusion, and determines the component on the basis of an evaluation result.

4. The apparatus according to claim 3, wherein said determiner employs a component which rarely affects the image quality little and for which an evaluation value indicating a degree of influence is not less than a preset value.

5. The apparatus according to claim 1, wherein when a texture formed in the image by error diffusion is present, said determiner determines the component on the basis of the texture.

6. The apparatus according to claim 5, wherein said determiner employs a component having a direction corresponding to a direction of the texture.

7. The apparatus according to claim 5, wherein said determiner employs a component having a direction substantially perpendicular to a direction of the texture.

8. The apparatus according to claim 1, wherein said embedding section embeds the dot pattern in the image that has undergone error diffusion using density maintaining processing.

9. An image processing method of embedding a dot pattern which indicates added information, comprising the steps of:

executing error diffusion for an image;

determining a component of the dot pattern to be embedded on the basis of the image that has undergone error diffusion; and embedding the dot pattern in the image that has undergone error diffusion using the determined component.

10. The method according to claim 9, wherein in said determining step, the component is determined on the basis of a power spectrum in a predetermined frequency domain after the dot pattern is embedded in the image that has undergone error diffusion.

11. The method according to claim 9, wherein in said determining step, when a texture formed in the image by error diffusion is present, the component is determined on the basis of the texture.

12. A computer program product stored a computer readable medium comprising computer program code, for an image processing method of embedding a dot pattern which indicates added information, comprising process procedure code for:

executing error diffusion for an image;

determining a component of the dot pattern to be embedded on the basis of the image that has undergone error diffusion; and embedding the dot pattern in the image that has undergone error diffusion using the determined component.

* * * * *

UNITED STATES PATENT AND TRADEMARK OFFICE
CERTIFICATE OF CORRECTION

PATENT NO.        : 7,027,189 B2
APPLICATION NO. : 10/026754
DATED             : April 11, 2006
INVENTOR(S)       : Kiyoshi Umeda It is certified that error appears in the above-identified patent and that said Letters Patent is hereby corrected as shown below:

TITLE PAGE:
Item (56) References Cited U.S. PATENT DOCUMENTS
"6,690,811 B1 * 2/2004 Au et al. ....382/100" should read -- 6,690,811 B2 * 2/2004 Au et al. ....382/100 --;
"6,824,240 B1 * 11/2004 Kusakabe et al. ....358/1.9" should read -- 6,824,240 B2 * 11/2004 Kusakabe et al. ....358/1.9 --; and
"6,853,736 B1 * 2/2005 Miyake ....382/100" should read -- 6,853,736 B2 * 2/2005 Miyaka ....382/100 --.

COLUMN 5:
Line 34, "is" should read -- are --; and
Line 41, "FIGS." should read -- FIG. --.

COLUMN 8:
Line 6, "to 18C" should read -- to 18C) --.

COLUMN 10:
Line 13, "stored a" should read -- stored on a --.

Signed and Sealed this

Twentieth Day of March, 2007

JON W. DUDAS
*Director of the United States Patent and Trademark Office*